United States Patent
Chen et al.

(10) Patent No.: US 10,156,081 B2
(45) Date of Patent: *Dec. 18, 2018

(54) CHLORINATORS AND REPLACEABLE CELL CARTRIDGES THEREFOR

(75) Inventors: Patrick Chen, North Kingstown, RI (US); Douglas Sawyer, Seekon, MA (US); James Carter, Warwick, RI (US)

(73) Assignee: Hayward Industries, Inc., Elizabeth, NJ (US)

( * ) Notice: Subject to any disclaimer, the term of this patent is extended or adjusted under 35 U.S.C. 154(b) by 531 days.

This patent is subject to a terminal disclaimer.

(21) Appl. No.: 13/561,836

(22) Filed: Jul. 30, 2012

(65) Prior Publication Data
US 2013/0105372 A1  May 2, 2013

Related U.S. Application Data

(60) Provisional application No. 61/513,372, filed on Jul. 29, 2011.

(51) Int. Cl.
| | |
|---|---|
| *E04H 4/12* | (2006.01) |
| *C25B 9/00* | (2006.01) |
| *C25B 1/24* | (2006.01) |
| *C02F 1/467* | (2006.01) |
| *C25B 15/02* | (2006.01) |
| *C02F 103/42* | (2006.01) |

(52) U.S. Cl.
CPC ......... *E04H 4/1281* (2013.01); *C02F 1/4674* (2013.01); *C25B 1/245* (2013.01); *C25B 9/00* (2013.01); *C02F 2103/42* (2013.01); *C02F 2201/006* (2013.01); *C02F 2201/4615* (2013.01); *C02F 2209/005* (2013.01); *C25B 15/02* (2013.01)

(58) Field of Classification Search
CPC ............ C02F 1/00; C25B 9/00; E04H 4/1281
USPC ......... 210/167.1, 748.2, 754, 94, 167.11, 97, 210/88; 204/242, 245
See application file for complete search history.

(56) References Cited

U.S. PATENT DOCUMENTS

| | | |
|---|---|---|
| 2,436,077 A | 2/1948 | Robertson |
| 2,644,700 A | 7/1953 | Woodling |
| 3,632,498 A | 1/1972 | Beer |

(Continued)

FOREIGN PATENT DOCUMENTS

| | | |
|---|---|---|
| CN | 2188767 Y | 2/1995 |
| WO | 2011/009170 A1 | 1/2011 |

OTHER PUBLICATIONS

Written Opinion dated Dec. 19, 2012, issued in connection with International Application No. PCT/US12/48891.

(Continued)

*Primary Examiner* — Heidi R Kelley
*Assistant Examiner* — Akash K Varma
(74) *Attorney, Agent, or Firm* — McCarter & English, LLP

(57) ABSTRACT

A chlorinator system for pools or spas is disclosed. The chlorinator system includes a replaceable chlorinator cell cartridge having built in sensors, switches, and custom connections. The chlorinator system includes a controller, a chlorinator, a replaceable cell cartridge, and compression fittings for connecting the chlorinator to piping of a pool or spa system. The cartridge includes a body, a bi-directional flow switch, a connector plug, a lid, a printed circuit board, which includes non-volatile memory, and electrically-charged plates or blades.

19 Claims, 19 Drawing Sheets

(56) References Cited

U.S. PATENT DOCUMENTS

| | | |
|---|---|---|
| 3,933,616 A | 1/1976 | Beer |
| 4,100,052 A | 7/1978 | Stillman |
| 4,107,452 A | 8/1978 | Razvi |
| 4,214,971 A | 7/1980 | Heikel et al. |
| 4,250,910 A | 2/1981 | King |
| 4,290,873 A | 9/1981 | Weaver |
| 4,774,977 A | 10/1988 | Cohen |
| 4,856,348 A | 8/1989 | Hall |
| 5,124,032 A | 6/1992 | Newhard |
| 5,217,261 A | 6/1993 | DeWitt et al. |
| 5,221,444 A | 6/1993 | Silveri |
| 5,228,964 A | 7/1993 | Middleby |
| 5,247,710 A | 9/1993 | Carder et al. |
| 5,254,226 A | 10/1993 | Williams et al. |
| 5,279,748 A | 1/1994 | Hackett |
| 5,314,589 A | 5/1994 | Hawley |
| 5,326,481 A | 7/1994 | Alwerud |
| 5,401,373 A | 3/1995 | Silveri |
| 5,422,014 A | 6/1995 | Allen et al. |
| 5,460,706 A | 10/1995 | Lisboa |
| 5,498,333 A | 3/1996 | Canther |
| 5,546,982 A | 8/1996 | Clark et al. |
| 5,580,438 A | 12/1996 | Silveri |
| 5,649,560 A | 7/1997 | Lenney et al. |
| 5,695,644 A | 12/1997 | Buchanan et al. |
| 5,730,861 A | 3/1998 | Sterghos et al. |
| 5,752,282 A | 5/1998 | Silveri |
| 5,759,384 A | 6/1998 | Silveri |
| 5,810,999 A | 9/1998 | Bachand et al. |
| 5,893,977 A | 4/1999 | Pucci |
| 5,932,093 A | 8/1999 | Chulick |
| 5,985,155 A | 11/1999 | Maitland |
| 5,993,669 A | 11/1999 | Fulmer |
| 6,007,693 A | 12/1999 | Silveri |
| 6,096,202 A | 8/2000 | Fulmer |
| 6,125,481 A | 10/2000 | Sicilano |
| 6,126,810 A | 10/2000 | Fricker et al. |
| RE37,055 E | 2/2001 | Silveri |
| 6,200,487 B1 | 3/2001 | Denkewicz, Jr. et al. |
| 6,210,566 B1 | 4/2001 | King |
| 6,217,754 B1 | 4/2001 | Ros |
| 6,221,257 B1 | 4/2001 | Grim |
| 6,228,272 B1 | 5/2001 | Gola |
| 6,235,188 B1 | 5/2001 | Nakamura et al. |
| 6,238,553 B1 | 5/2001 | Lin |
| 6,238,555 B1 | 5/2001 | Silveri et al. |
| 6,270,680 B1 | 8/2001 | Silveri et al. |
| 6,287,466 B1 | 9/2001 | Yassin |
| 6,444,129 B1 | 9/2002 | Collins |
| 6,620,315 B2 | 9/2003 | Martin |
| 6,623,647 B2 | 9/2003 | Martin |
| 6,749,759 B2 | 6/2004 | Denes et al. |
| 6,756,907 B2 | 6/2004 | Holloway |
| 6,761,827 B2 | 7/2004 | Coffey |
| 6,814,095 B2 | 11/2004 | King |
| 6,827,847 B1 | 12/2004 | Chauvier |
| 6,895,307 B2 | 5/2005 | Gardner, Jr. |
| 6,948,510 B2 | 9/2005 | King |
| 7,014,753 B2 | 3/2006 | Holstein et al. |
| 7,211,176 B2 | 5/2007 | Hin et al. |
| 7,390,399 B2 | 6/2008 | Dennis, II et al. |
| 7,393,450 B2 | 7/2008 | Silveri |
| 7,402,252 B2 | 7/2008 | Kadlec et al. |
| 7,472,434 B1 | 1/2009 | Moldthan et al. |
| 7,507,323 B1 | 3/2009 | Eyal |
| 7,641,868 B2 | 1/2010 | Jang |
| 7,658,824 B2 | 2/2010 | Bremauer |
| 7,695,613 B2 | 4/2010 | Doyle et al. |
| 7,722,746 B1 | 5/2010 | Eyal |
| 7,767,067 B2 | 8/2010 | Silveri |
| 7,867,401 B2 | 1/2011 | Dennis, II et al. |
| 7,879,208 B2 | 2/2011 | Wu et al. |
| 7,901,620 B2 | 3/2011 | Taguchi et al. |
| 8,075,751 B2 | 12/2011 | Xie et al. |
| 8,123,956 B2 | 2/2012 | King et al. |
| 8,887,556 B2 | 11/2014 | Silveri |
| 2001/0010296 A1 | 8/2001 | Hirota et al. |
| 2002/0035403 A1 | 3/2002 | Clark et al. |
| 2002/0108913 A1 | 8/2002 | Collins |
| 2002/0152036 A1 | 10/2002 | Martin |
| 2003/0160005 A1 | 8/2003 | Martin |
| 2003/0168389 A1 | 9/2003 | Astle et al. |
| 2004/0050781 A1* | 3/2004 | Coffey .................. C02F 1/4606 210/634 |
| 2004/0204779 A1* | 10/2004 | Mueller et al. .................. 700/83 |
| 2004/0206706 A1 | 10/2004 | Costa et al. |
| 2004/0249579 A1 | 12/2004 | Centanni |
| 2005/0009192 A1 | 1/2005 | Page |
| 2005/0137118 A1 | 6/2005 | Silveri |
| 2005/0222786 A1 | 10/2005 | Tarpo et al. |
| 2006/0027463 A1 | 2/2006 | Lavelle et al. |
| 2006/0060512 A1 | 3/2006 | Astle et al. |
| 2006/0091002 A1* | 5/2006 | Hin ....................... C02F 1/4674 204/245 |
| 2006/0097878 A1 | 5/2006 | Von Broembsen |
| 2006/0113256 A1 | 6/2006 | Birkbeck |
| 2006/0169647 A1 | 8/2006 | Doyle et al. |
| 2006/0249400 A1 | 11/2006 | Bremauer |
| 2006/0266682 A1 | 11/2006 | Kennedy et al. |
| 2006/0283789 A1 | 12/2006 | Kadlec et al. |
| 2006/0283808 A1 | 12/2006 | Kadlec et al. |
| 2007/0061051 A1 | 3/2007 | Maddox |
| 2007/0144911 A1 | 6/2007 | Pulis |
| 2007/0154322 A1 | 7/2007 | Stiles et al. |
| 2007/0158274 A1 | 7/2007 | King |
| 2007/0181439 A1 | 9/2007 | Wu et al. |
| 2007/0215531 A1 | 9/2007 | Wawrla et al. |
| 2007/0244576 A1 | 10/2007 | Potucek et al. |
| 2008/0039977 A1 | 2/2008 | Clark et al. |
| 2008/0173574 A1 | 7/2008 | Silveri |
| 2008/0212782 A1 | 9/2008 | Brettle et al. |
| 2008/0237148 A1 | 10/2008 | Dennis et al. |
| 2008/0264447 A1 | 10/2008 | Eyal |
| 2008/0289706 A1 | 11/2008 | King et al. |
| 2009/0060269 A1 | 3/2009 | Rhoads |
| 2009/0212782 A1 | 8/2009 | Silveri |
| 2009/0218296 A1 | 9/2009 | King et al. |
| 2009/0266231 A1 | 10/2009 | Franzen et al. |
| 2009/0282627 A1 | 11/2009 | Porat |
| 2009/0294381 A1 | 12/2009 | Coffey et al. |
| 2010/0018930 A1 | 1/2010 | King et al. |
| 2010/0032355 A1 | 2/2010 | Andrews et al. |
| 2010/0096260 A1 | 4/2010 | Xie et al. |
| 2010/0096338 A1 | 4/2010 | De Wet et al. |
| 2010/0101010 A1 | 4/2010 | McCague |
| 2010/0187122 A1 | 7/2010 | Zolotarsky |
| 2010/0206815 A1 | 8/2010 | Garusi et al. |
| 2010/0250449 A1* | 9/2010 | Doyle et al. .................. 705/302 |
| 2010/0254825 A1 | 10/2010 | Stiles, Jr. et al. |
| 2010/0313964 A1* | 12/2010 | Hin ....................... C02F 1/006 137/15.01 |
| 2011/0010835 A1 | 1/2011 | McCague |
| 2011/0048964 A1 | 3/2011 | Luebke et al. |
| 2011/0049060 A1 | 3/2011 | Uy |
| 2011/0062086 A1 | 3/2011 | Burns et al. |
| 2011/0073488 A1 | 3/2011 | Lin |
| 2011/0290707 A1 | 12/2011 | Porat |
| 2013/0105372 A1 | 5/2013 | Chen et al. |
| 2013/0105373 A1 | 5/2013 | Chen |
| 2013/0105403 A1 | 5/2013 | Chen et al. |
| 2014/0326680 A1 | 11/2014 | Mastio |
| 2016/0131608 A1 | 5/2016 | Howes, Jr. |

OTHER PUBLICATIONS

International Search Report of the International Search Authority dated Dec. 19, 2012, issued in connection with International Application No. PCT/US12/48891.

International Search Report of the International Searching Authority dated Sep. 28, 2012, issued in connection with International Application No. PCT/US12/48888.

(56) References Cited

OTHER PUBLICATIONS

Written Opinion of the International Searching Authority dated Sep. 28, 2012, prepared in connection with International Application No. PCT/US12/48888.
"Clearwater In-Line Chlorinator Installation Instructions," Waterway Plastics, 2008.
"Jandy Installation and Operation Manual," Zodiac Pool Systems, Inc., 2010.
"Jandy UltraFlex 2 Installation and Maintenace Guide," Zodiac Pool Systems, Inc., 2009.
International Search Report of the International Search Authority dated Oct. 1, 2012, issued in connection with International Application No. PCT/US12/48874.
Written Opinion dated Oct. 1, 2012, issued in connection with International Application No. PCT/US12/48874.
Notification concerning transmittal of International Preliminary Report on Patentability, dated Feb. 13, 2014, issued in connection with International Application No. PCT/US12/48874.
Hayward "Salt and Swim Installation Quick Start Guide", earliest known date May 28, 2012 (from waybackmachine.com).
European Search Report dated May 7, 2015, issued by the European Patent Office in connection with European Patent Application No. 12820373.4 (5 page).
European Search Report dated Jul. 1, 2015, issued by the European Patent Office in connection with European Patent Application No. 12820744.6 (7 pages).
International Search Report of the International Search Authority dated May 5, 2014, issued in connection with International Application No. PCT/US14/13390 (3 pages).
The Written Opinion of the International Searching Authority dated May 5, 2014, issued in connection with International Application No. PCT/US14/13390 (8 pages).
Patent Examination Report No. 2, dated Sep. 4, 2017, issued in connection with Australian Application No. 2012290213 (5 pages).
Notice of Allowance dated Sep. 14, 2017 issued in connection with U.S. Appl. No. 13/562,128 (8 pages).
Patent Examination Report No. 3, dated Sep. 14, 2017, issued in connection with Australian Application No. 2012290213 (5 pages).
Office Action dated Jan. 21, 2016, issued in connection with U.S. Appl. No. 13/562,128 (19 pages).
Extended European Search Report dated Feb. 17, 2016, issued by the European Patent Office in connection with European Patent Application No. 12820228.0 (13 pages).
Office Action dated Jun. 22, 2016, issued in connection with U.S. Appl. No. 13/562,043 (16 pages).
Office Action dated Jan. 5, 2017, issued in connection with U.S. Appl. No. 13/562,128 (19 pages).
Office Action dated Feb. 14, 2017, issued in connection with U.S. Appl. No. 13/562,043 (19 pages).
Office Action dated Mar. 31, 2015, issued in connection with U.S. Appl. No. 13/562,043 (13 pages).
Office Action dated Oct. 2, 2015, issued in connection with U.S. Appl. No. 13/562,043 (11 pages).
Patent Examination Report No. 1, dated May 13, 2016, issued in connection with Australian Application No. 2012290215 (4 pages).
Patent Examination Report No. 1, dated Jul. 29, 2016, issued in connection with Australian Application No. 2012290292 (3 pages).
Patent Examination Report No. 1, dated Sep. 16, 2016, issued in connection with Australian Application No. 2012290213 (5 pages).
Extended European Search Report dated Oct. 26, 2015, issued by the European Patent Office in connection with European Patent Application No. 12820228.0 (6 pages).
Patent Examination Report No. 2, dated Jun. 22, 2017, issued in connection with Australian Application No. 2012290292 (5 pages).
Action dated Apr. 28, 2015 from U.S. Appl. No. 13/562,128 (19 pages).
Office Action dated Oct. 4, 2017, issued in connection with U.S. Appl. No. 13/562,043 (26 pages).
Communication Pursuat to Article 94(3) dated Oct. 4, 2017, issued by the European Patent Office in connection with European Patent Application No. 12820373.4 (4 pages).
Notice of Allowance dated Nov. 7, 2017 issued in connection with U.S. Appl. No. 13/562,128 (9 pages).
Patent Examination Report No. 1, dated Nov. 17, 2017, issued in connection with Australian Application No. 2017203145 (4 pages).
Office Action dated May 7, 2018, issued in connection with U.S. Appl. No. 13/562,043 (31 pages).
Notice of Allowance dated Jun. 28, 2017 issued in connection with U.S. Appl. No. 13/562,128 (8 pages).
Invitation to Pay Additional Fees and, Where Applicable, Protest Fee dated May 8, 2018, issued in connection with International Patent Application No. PCT/US18/23514 (2 pages).
International Search Report of the International Searching Authority dated Jul. 5, 2018, issued in connection with International Application No. PCT/US18/23514 (5 pages).
Written Opinion of the International Searching Authority dated Jul. 5, 2018, issued in connection with International Application No. PCT/US18/23514 (6 pages).
Communication Pursuant to Article 94(3) EPC dated Sep. 21, 2018, issued by the European Patent Office in connection with European Patent Application No. 12820744.6 (8 pages).

* cited by examiner

CHLORINATORS AND REPLACEABLE CELL CARTRIDGES THEREFOR

CROSS-REFERENCE TO RELATED APPLICATION

The present application claims the benefit of U.S. Provisional Application Ser. No. 61/513,372 filed Jul. 29, 2011, the entire disclosure of which is expressly incorporated herein by reference.

BACKGROUND

Technical Field

The present disclosure relates to chlorinators, and more particularly, to replaceable cell chlorinators having built-in sensors, switches, and custom connections.

Related Art

In the pool and spa field, it is important that water be adequately sanitized to prevent the growth of microorganisms, algae, etc. Adequate sanitization is important not only to protect the health and safety of bathers, but to also ensure proper water clarity in a pool or spa. A number of sanitization techniques have been implemented to sanitize pool/spa water, such as chemical additives (e.g., chlorine, bromine, etc.), introduction of ozone into pool/spa water, ultraviolet sanitization, etc.

Electrolytic cells (or, so-called "salt chlorinators") represent one way of sanitizing a pool or spa. In this arrangement, an amount of salt (sodium chloride) is periodically added to pool or spa water (e.g., a few times per year), an electric charge is imparted on the electrolytic cell, and pool or spa water is pumped through the cell. Through electrolysis, the salt in the water is converted to free chlorine, which is subsequently pumped into the pool or spa to sanitize water. One advantage to this approach is a reduction in the amount of chemicals that need to periodically be added to pool or spa water, in contrast to conventional chemical chlorination techniques which require frequent addition of dry or liquid chemicals to the pool/spa (e.g., by way of powder, tablets, etc.) in order to sanitize same.

Existing salt chlorinators have separate temperature and/or flow sensors that necessitate additional wiring and connections. Further, the temperature and/or flow sensors are often separate from the replaceable chlorinator cartridges. As such, when a chlorinator cartridge is replaced, the same sensors are retained in the salt chlorinator system even though they may have exceeded their useful life. As a result, many chlorinator systems operate with old, faulty, or broken sensors.

The flow switches/sensors commonly used in salt chlorinators are unidirectional and must be mounted in the proper orientation in order to function. That is, these sensors can only detect fluid flowing in one direction, and therefore must be mounted so that the detection direction corresponds to the flow direction. When the flow sensor is mounted in any other orientation, it may either not function at all or provide inaccurate readings. Existing bi-directional flow switches/sensors are extremely expensive and often use technology that requires difficult calibration that cannot be performed by a layperson. As such, these flow sensors are usually limited to industrial applications.

Salt chlorinator systems that utilize replaceable chlorinator cartridges create a market for "knock-off" cell cartridges. This is primarily because a single chlorinator cartridge is designed for a single season of use, and therefore must be replaced at the beginning of each season. Knock-off cell cartridges not only have an economic impact, but can often create unsafe conditions. Specifically, only particular chlorinator cells should be used with specific chlorinator power supplies/controllers in order to ensure the safety of the system and the users. Standard connector systems allow knock-off companies to easily design cell cartridges to work with various chlorinators.

The present disclosure overcomes one or more of the drawbacks and/or disadvantages of the prior art discussed above.

SUMMARY

The present disclosure relates to a chlorinator system for pools or spas that includes a replaceable chlorinator cell cartridge having built in sensors, switches, and custom connections. The chlorinator system includes a controller, a chlorinator, a replaceable cell cartridge, and compression fittings for connecting the chlorinator to piping of a pool or spa system. The chlorinator body connects to the piping and houses the chlorinator cartridge. The cartridge includes a body, a bi-directional flow switch, a connector plug, a lid, a printed circuit board, and electrically-charged plates or blades. The body defines one or more flow guides and hingedly supports the bi-directional flow switch. In one embodiment, the bi-directional flow switch is a hinged paddle that is detected by a reed switch, or equivalent sensor, mounted on the printed circuit board. The printed circuit board further includes one or more sensors mounted thereto which could include a temperature sensor, pH sensor, oxidation reduction potential (ORP) sensor, etc. Connected to the printed circuit board is a plug which includes a plurality of pins extending therethrough and in electrical communication with the printed circuit board. The plug is shaped, and the plurality of pins are arranged, such that the cell is only operable with a compatible chlorinator.

In one embodiment, a replaceable cartridge for a chlorinator is provided. The replaceable cartridge includes a cartridge body having a plurality of electrically-charged plates, and a printed circuit board in electrical communication with the electrically-charged plates. The printed circuit board includes a non-volatile memory for storing information relating to operation of the replaceable cartridge.

In one embodiment, a chlorinator includes a body installable inline with a piping of a pool or a spa system. The chlorinator includes a replaceable cartridge receivable within the body, the replaceable cartridge having a cartridge body having a plurality of electrically-charged plates and a printed circuit board in electrical communication with the electrically-charged plates. The printed circuit board includes a non-volatile memory for storing information relating to operation of the replaceable cartridge.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to a replaceable cell cartridge for chlorinators, as discussed in detail below in connection with FIGS. 1-26. As used herein, the terms "cell" and "chlorinator" are used interchangeably.

Figure 1:
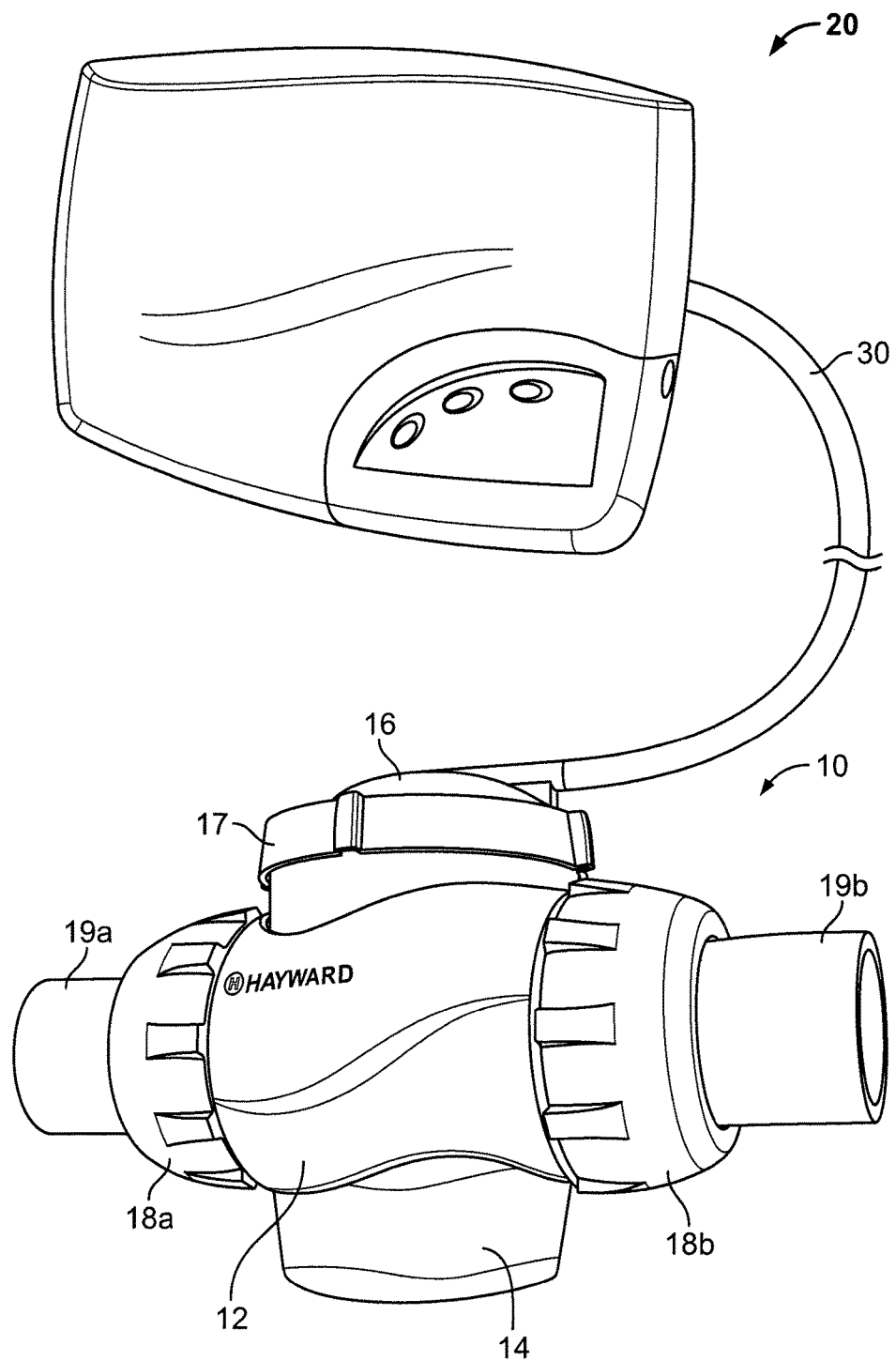
FIG. 1 is a perspective view of a chlorinator and controller of the present invention.

In FIG. 1, a perspective view of a chlorinator 10 and a controller 20 of the present invention is shown. The system includes the chlorinator 10 and the controller 20, which are electrically interconnected by a cable 30. The cable 30 connects to the controller 20 by a plug 31 (see FIG. 7), and allows for two-way communication between the controller 20 and the chlorinator 10. The two-way communication allows the controller 20 to provide the chlorinator 10 with instructions, and allows the chlorinator 10 to provide the controller 20 with details regarding status, operational parameters (e.g., temperature, flow detection, pH levels, etc.), and history, among other things.

FIGS. 2-10 show the chlorinator 10 of the present invention in greater detail. The chlorinator 10 includes a casing 12, a transparent or translucent body 14, a screw cap 17, a first nut 18a, and a second nut 18b. The nuts 18a, 18b permit connection of a first pipe segment 19a and a second pipe segment 19b to the chlorinator 10. The body 14 houses a chlorinator cartridge (or cell) 40, discussed in greater detail below. The cable 30 extends from the controller 20 and connects to a cartridge lid 16 that couples to the chlorinator cartridge 40. The cable 30 extends from the exterior of the cartridge lid 16 to the interior, thus providing electrical communication between the controller 20 and the chlorinator cartridge 40. The cable 30 is secured to a cable port with a water-tight seal. The cartridge lid 16 is sealingly secured to the chlorinator cartridge 40. Secured to the chlorinator 10 are the first pipe segment 19a and the second pipe segment 19b. The pipe segments 19a, 19b are secured to the chlorinator 10 by a first nut 18a and a second nut 18b, respectively. Details of this attachment are described in greater detail below. It is noted that communication between the chlorinator 10 and the controller 20 could also be provided by way of a wireless connection in place of the cable 30.

Figure 2:
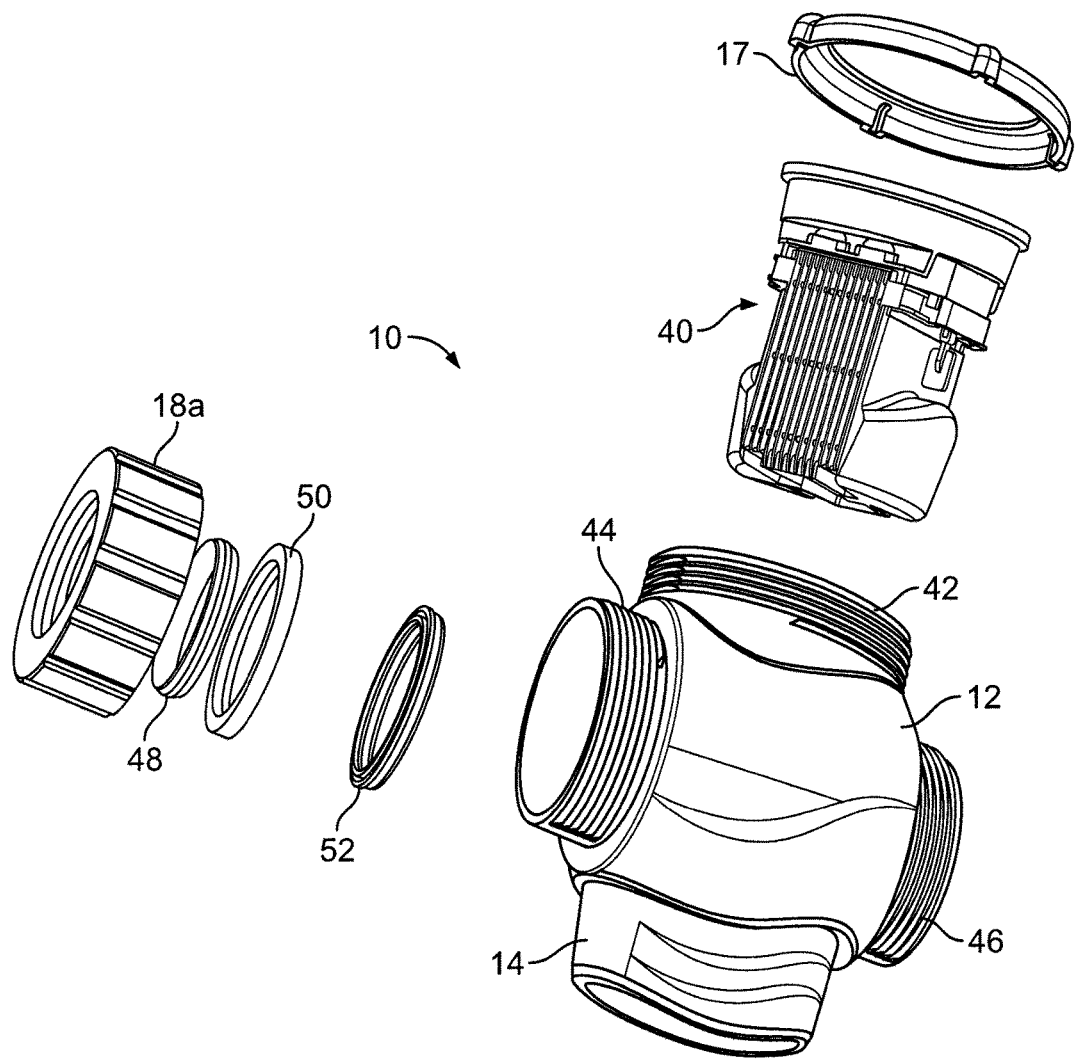
FIG. 2 is a first exploded view of the chlorinator.
Figure 3:
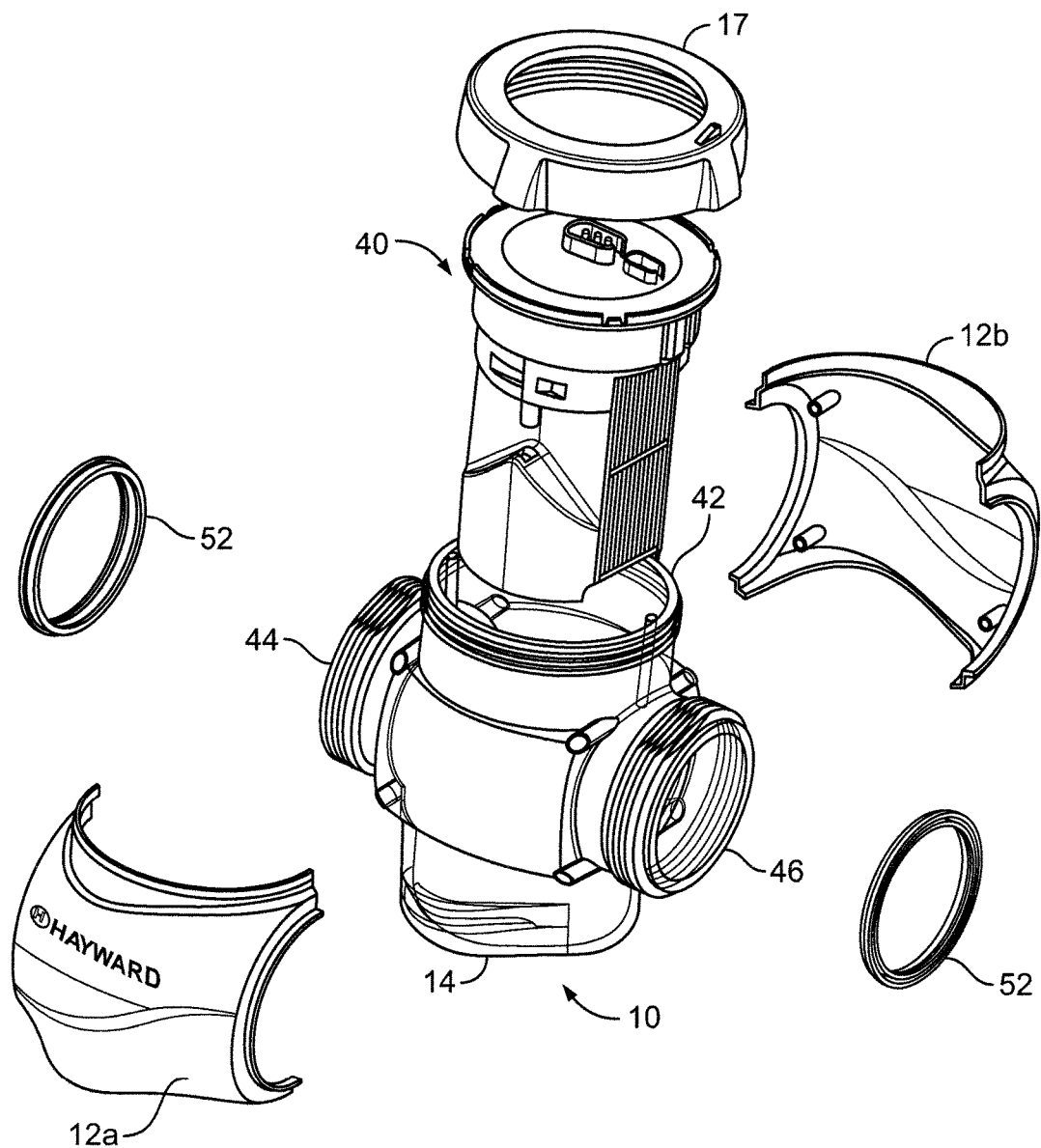
FIG. 3 is a second exploded view of the chlorinator illustrating first and second glamour plates.
Figure 4:
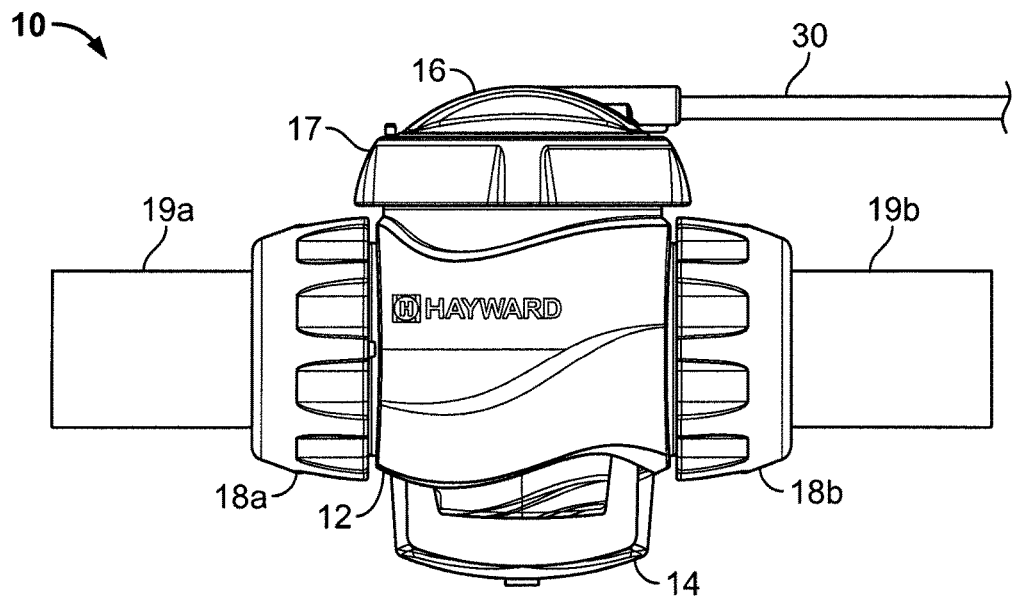
FIG. 4 is a front view of the chlorinator.
Figure 5:
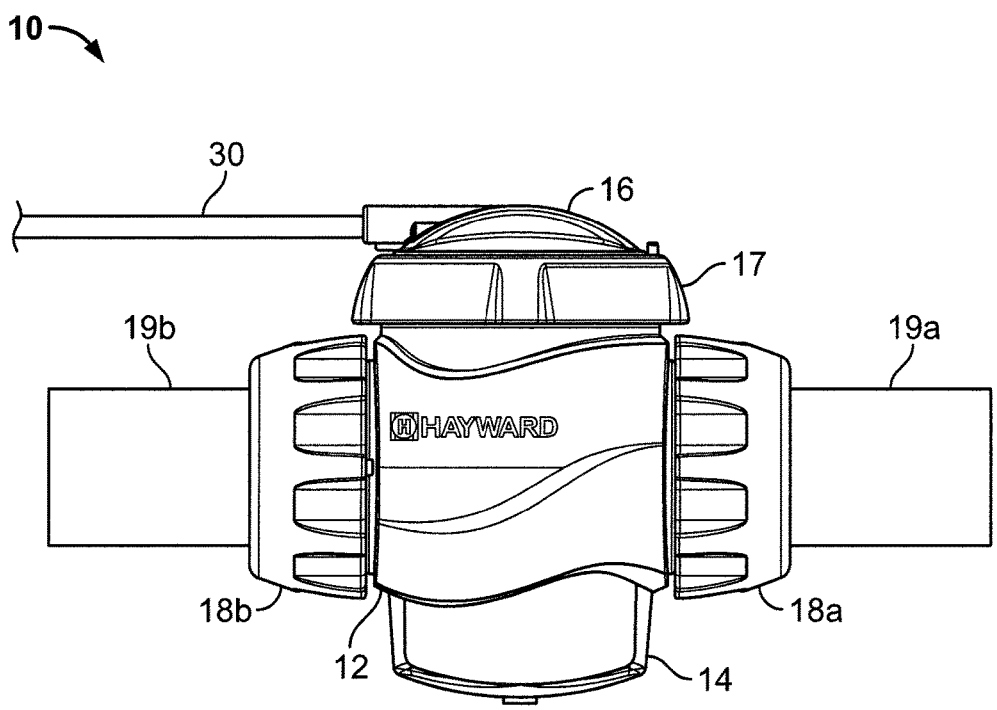
FIG. 5 is a rear view of the chlorinator.
Figure 6:
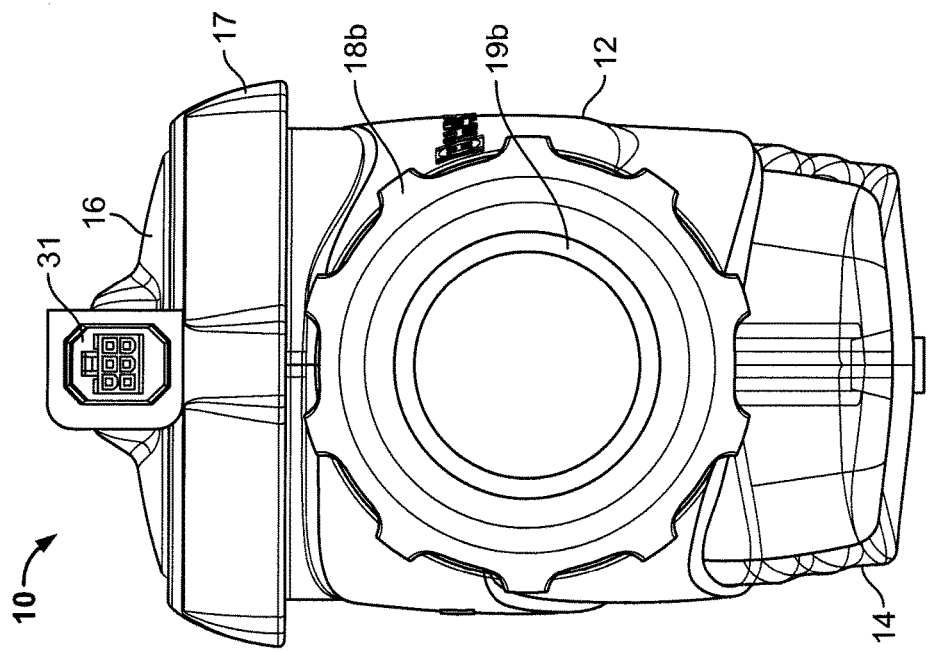
FIG. 6 is a left side view of the chlorinator.
Figure 7:
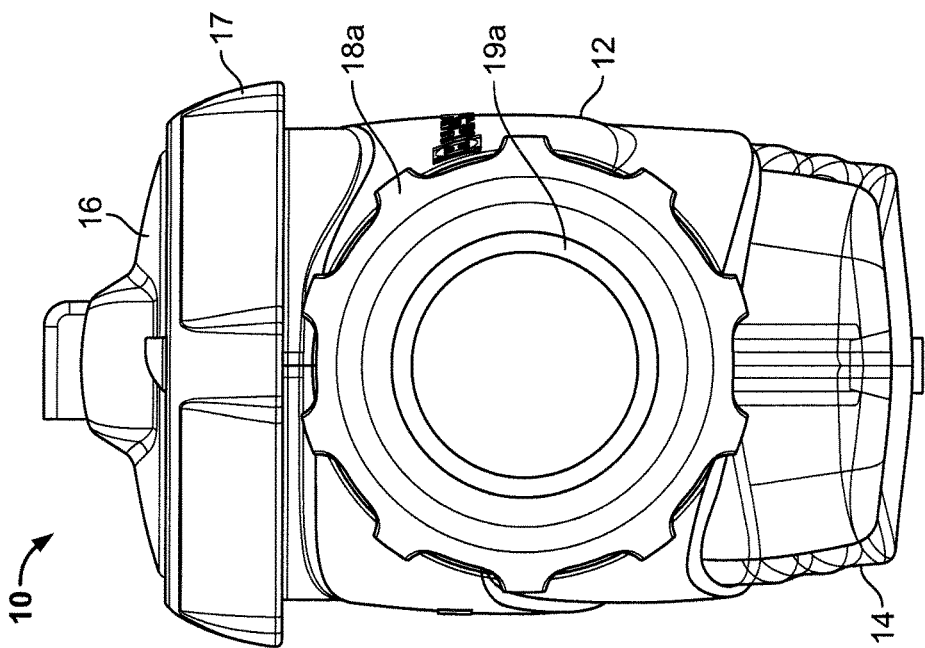
FIG. 7 is a right side view of the chlorinator.
Figure 8:
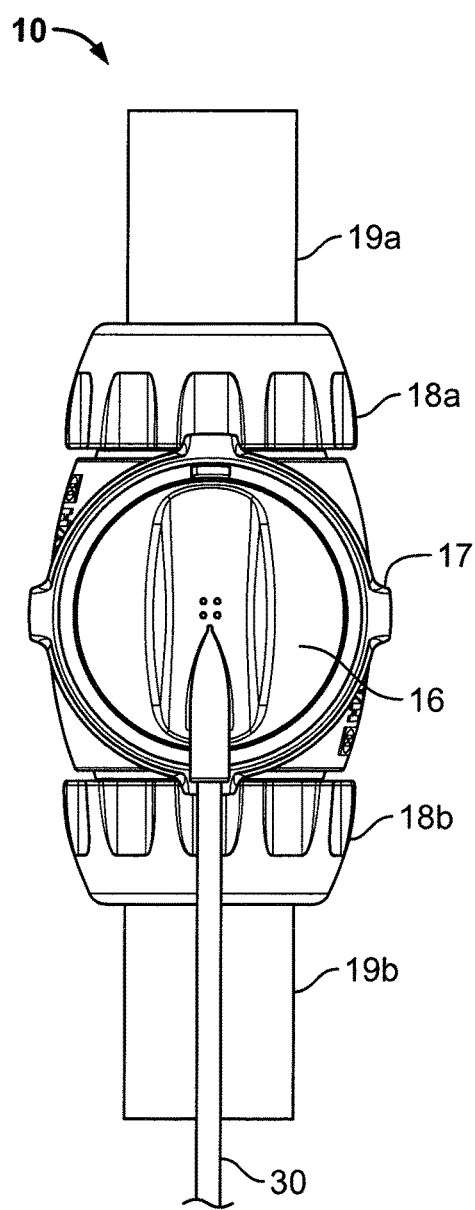
FIG. 8 is a top view of the chlorinator.
Figure 9:
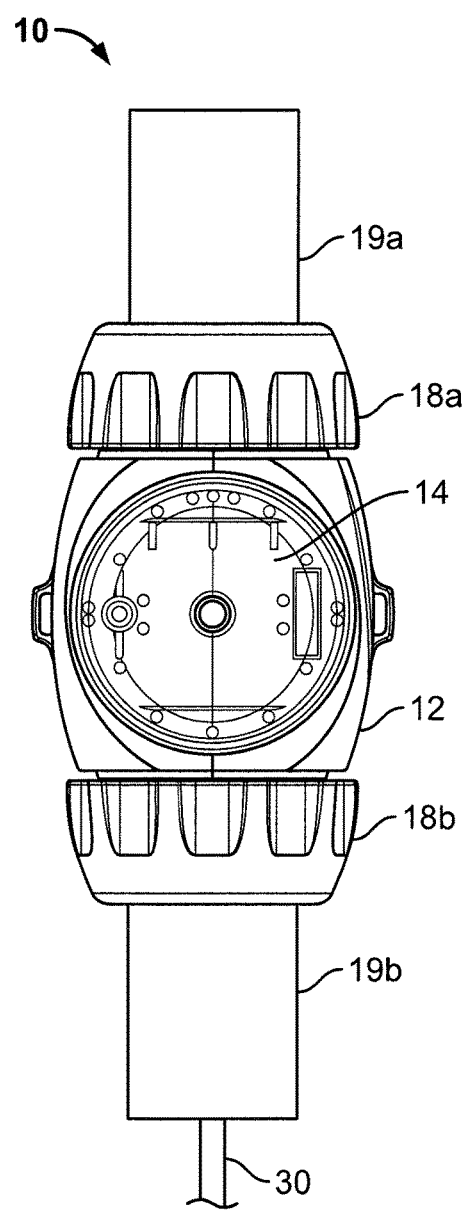
FIG. 9 is a bottom view of the chlorinator.

With particular reference to FIGS. 2 and 3, there is shown an exploded view of the chlorinator 10 including the chlorinator cartridge 40. As illustrated in FIG. 2, the body 14 includes a cartridge port 42, first flow port 44 and second flow port 46. As shown in FIG. 3, the chlorinator 10 may include a first glamour plate 12a and a second glamour plate 12b which form the casing 12. The cartridge port 42 provides an opening that allows the chlorinator cartridge 40 to be inserted into and placed within the body 14. The cartridge port 42 also includes external threading that mates with the internal threading of the screw cap 17, allowing the screw cap 17 to be secured to the cartridge port 42. The first flow port 44 and the second flow port 46 also include external threading that allows the first nut 18a and the second nut 18b to be threadably attached to the respective flow ports 44, 46. Positioned between each nut 18a, 18b and the respective flow ports 44, 46 are compression rings 48, collars 50, and face sealing gaskets 52. Together with the nuts 18a, 18b, these components comprise compression fittings which sealingly secure the pipe segments 19a, 19b to the chlorinator 10.

Figure 10:
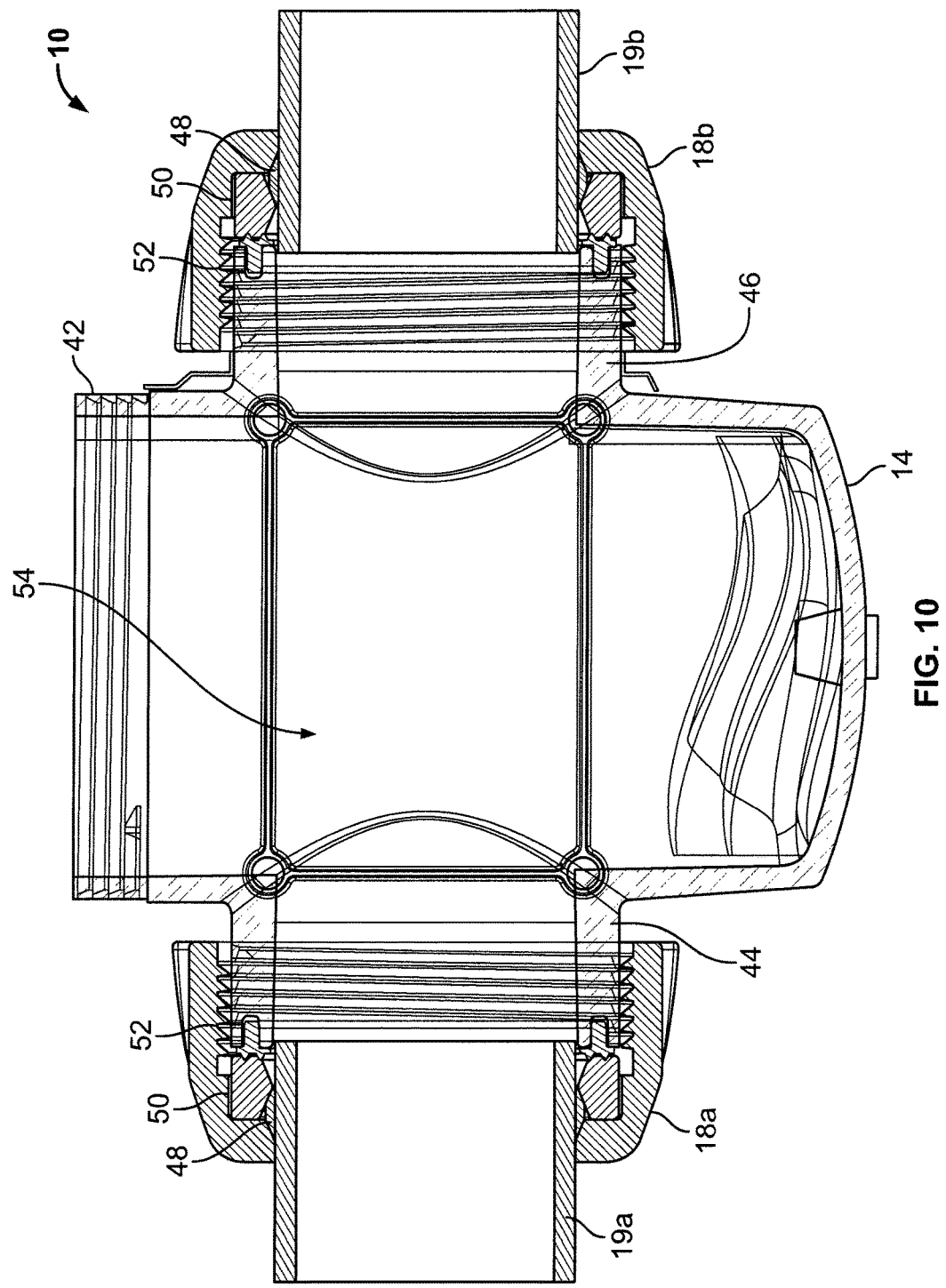
FIG. 10 is a partial sectional view of the chlorinator, piping, and compression fittings of the present disclosure, showing details of the sealing engagement provided by the compression fittings.

Referring now to FIG. 10, there is shown a partial cross-sectional view of the chlorinator 10 sealingly engaged with the first pipe segment 19a and the second pipe segment 19b. The body 14 of the chlorinator 10 defines a cartridge housing area 54 that receives the chlorinator cartridge 40. Importantly, the sealing relationship between the first flow port 44, first pipe segment 19a, first nut 18a, compression ring 48, collar 50, and face sealing gasket 52, is the same for the second flow port 46, second pipe segment 19b, second nut 18b, compression ring 48, collar 50, and face sealing gasket 52. That is, there is an identical sealing assembly at both flow ports 44 and 46. The components are arranged such that the face sealing gasket 52 engages and is compressed between a front annular face of the first flow port 44 and the collar 50, and the compression ring 48 is compressed against the first pipe segment 19a. The compression ring 48 may have first and second slanted surfaces which engage, respectively, a slanted surface of the first nut 18a and a slanted surface of the collar 50. Importantly, the first pipe segment 19a is inserted through the compression ring 48 so that the compression ring 48 surrounds the first pipe segment 19a.

During installation, threadably tightening the first nut 18a on to the first flow port 44 causes the first nut 18a to drive the collar 50, the compression ring 48, and the face sealing gasket 52 toward the first flow port 44. When fully tightened, the face sealing gasket 52 is compressed between the front annular face of the first flow port 44 and the collar 50. Further, the compression ring 48 is compressed between the first nut 18a and the collar 50, and deforms to form a seal against the outer surface of the first pipe segment 19a. Additionally, the compression ring 48 slightly deforms the first pipe segment 19a, thereby preventing it from backing off under pressure-induced thrust loading. As a result, the first pipe segment 19a does not require secondary restraint under proper pool pressures. Engaging the first pipe segment 19a and the second pipe segment 19b with the chlorinator 10 creates a fluid tight system where water can flow from the first pipe segment 19a into the chlorinator 10 and out the second pipe segment 19b to be recirculated into a pool, spa, or other water facility into which the chlorinator 10 may be incorporated.

Figure 11:
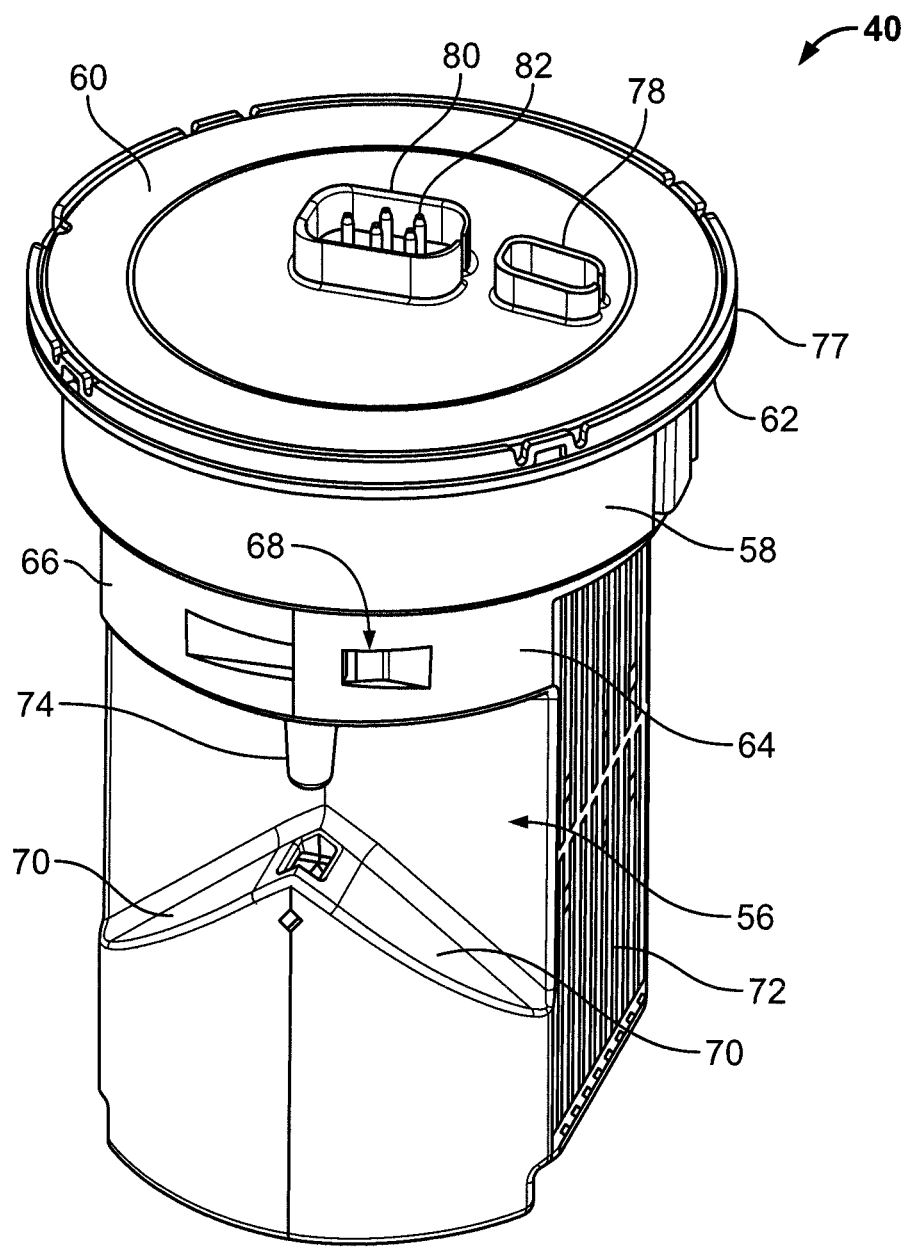
FIG. 11 is a top perspective view of a chlorinator cartridge.

As mentioned previously, the body 14 of the chlorinator 10 defines a cartridge housing area 54 that receives and houses the chlorinator cartridge 40. FIG. 11 is a top perspective view of the chlorinator cartridge 40. The chlorinator cartridge 40 includes a cartridge body 56, cartridge cap 58, cartridge cap cover 60 and o-ring 62.

Figure 12:
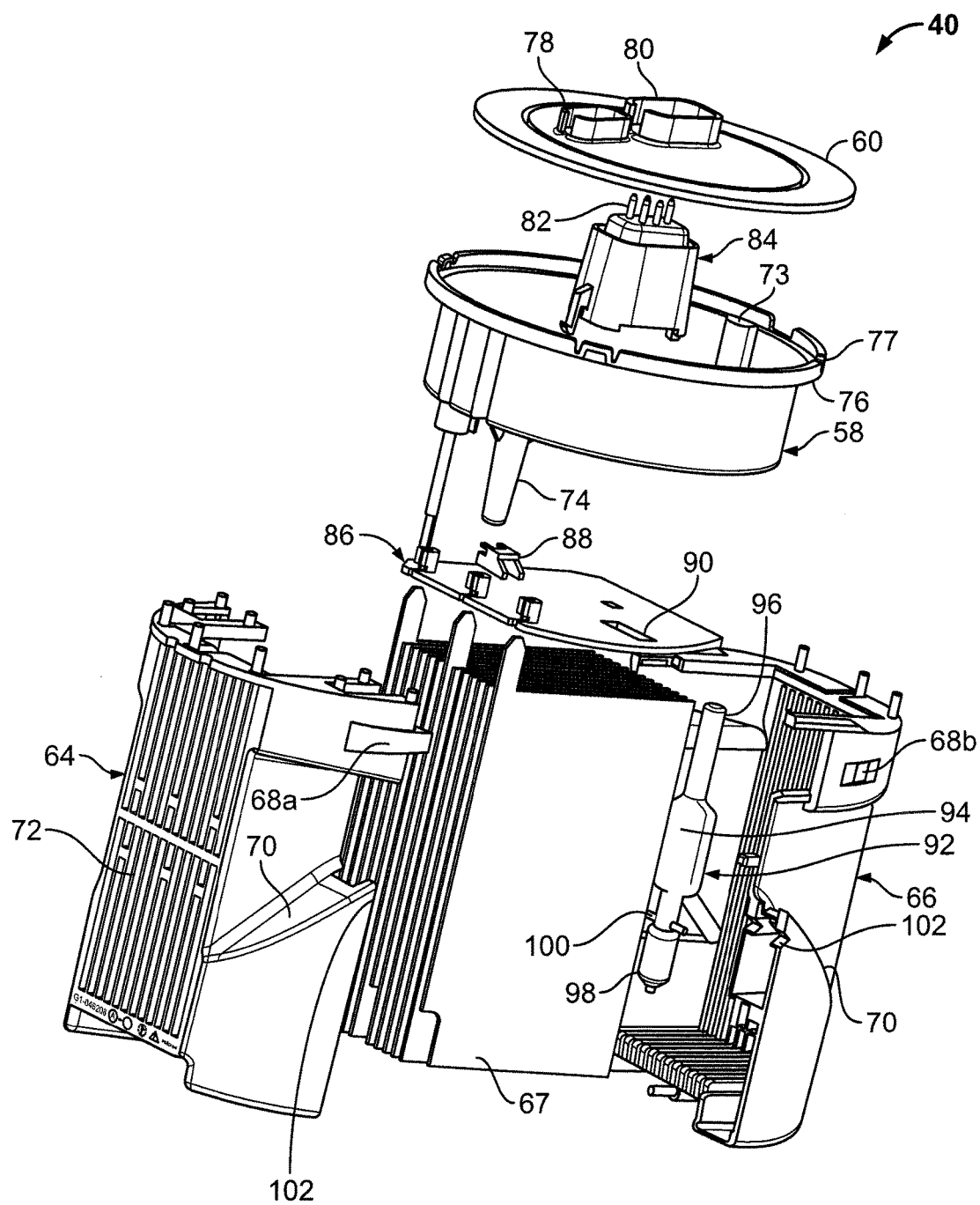
FIG. 12 is an exploded view of a chlorinator cartridge.
Figure 13:
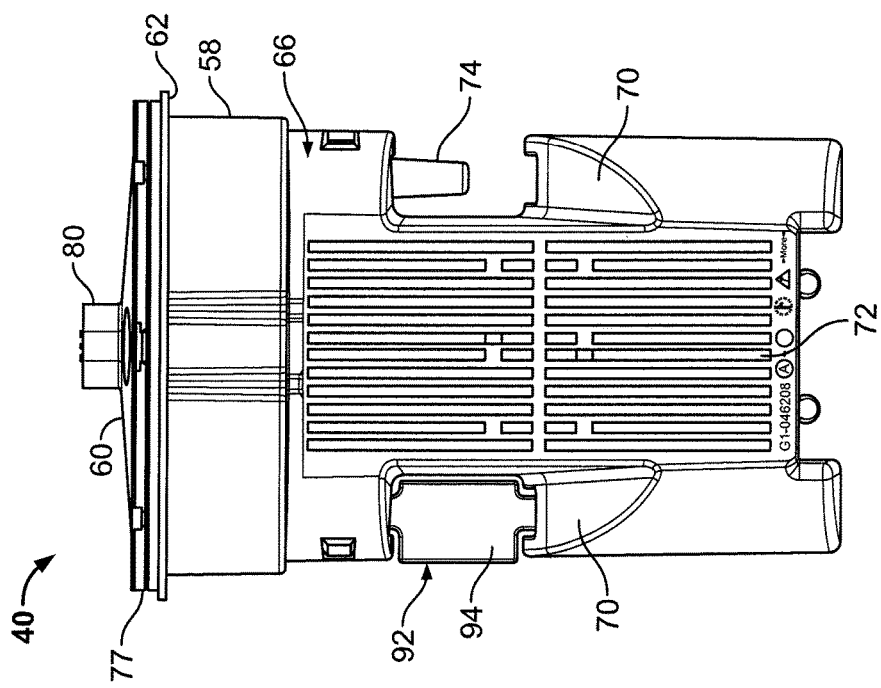
FIG. 13 is a front view of a chlorinator cartridge.
Figure 14:
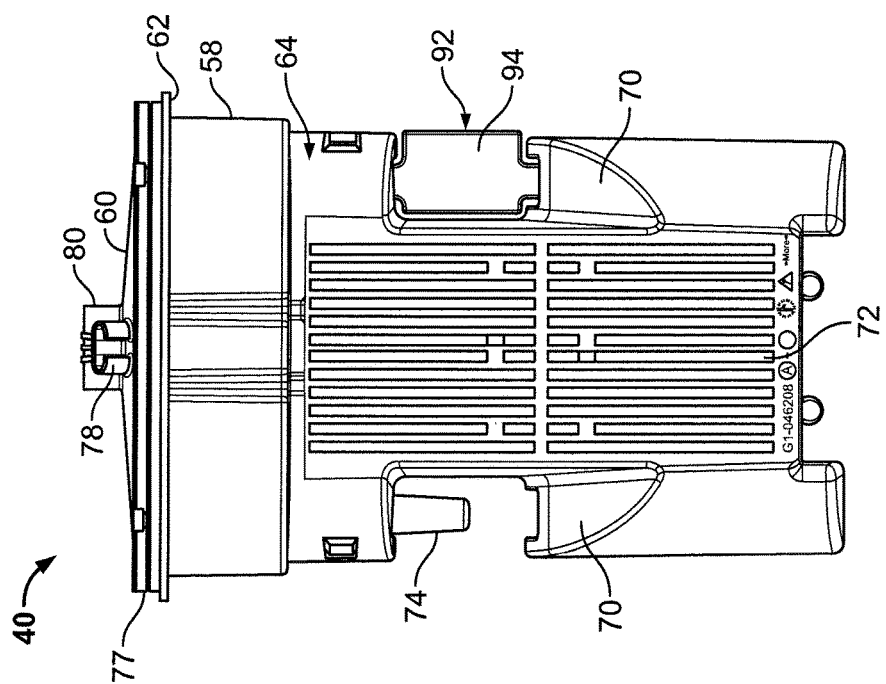
FIG. 14 is a rear view of a chlorinator cartridge.
Figure 15:
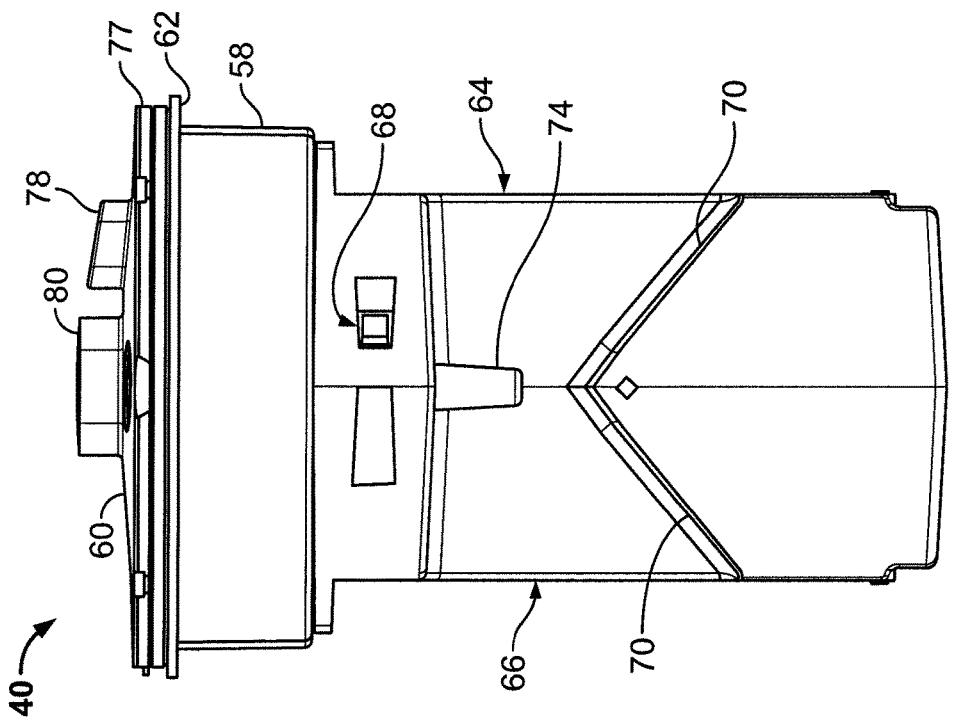
FIG. 15 is a right side view of a chlorinator cartridge.
Figure 16:
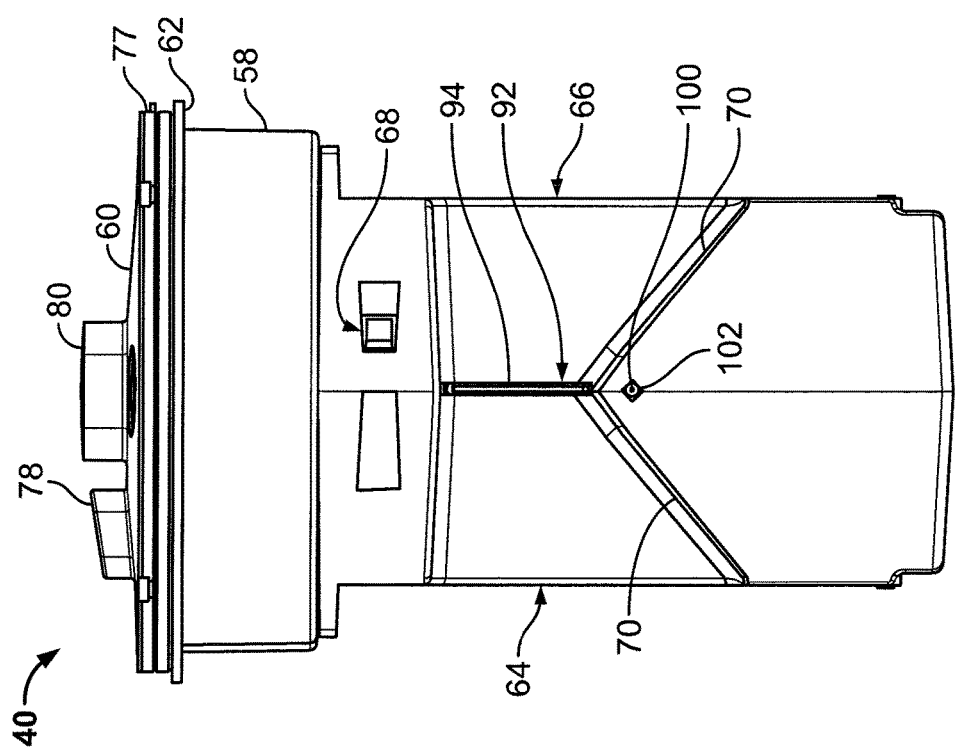
FIG. 16 is a left side view of a chlorinator cartridge.
Figure 17:
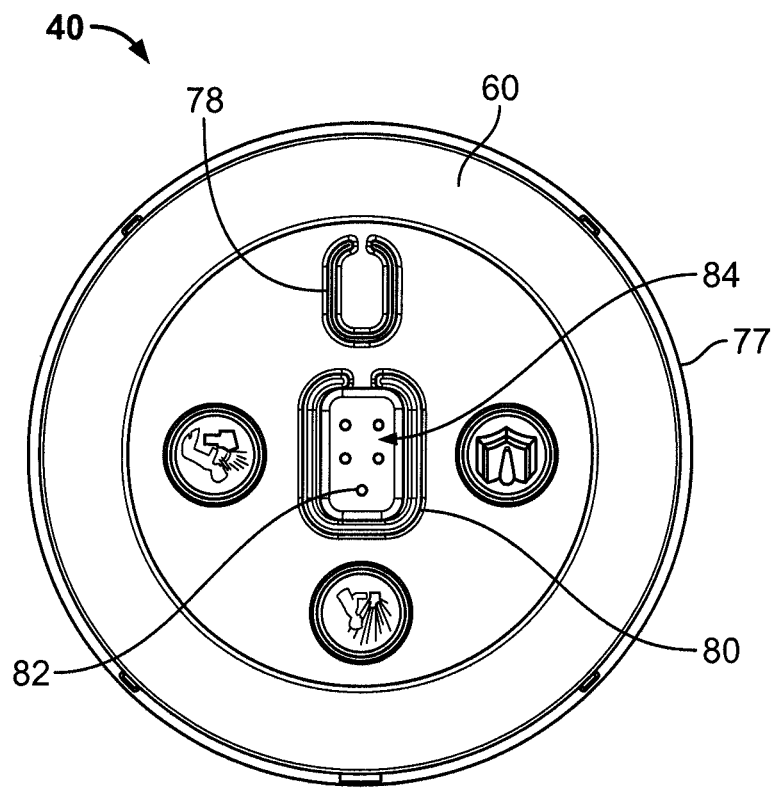
FIG. 17 is a top view of a chlorinator cartridge.
Figure 18:
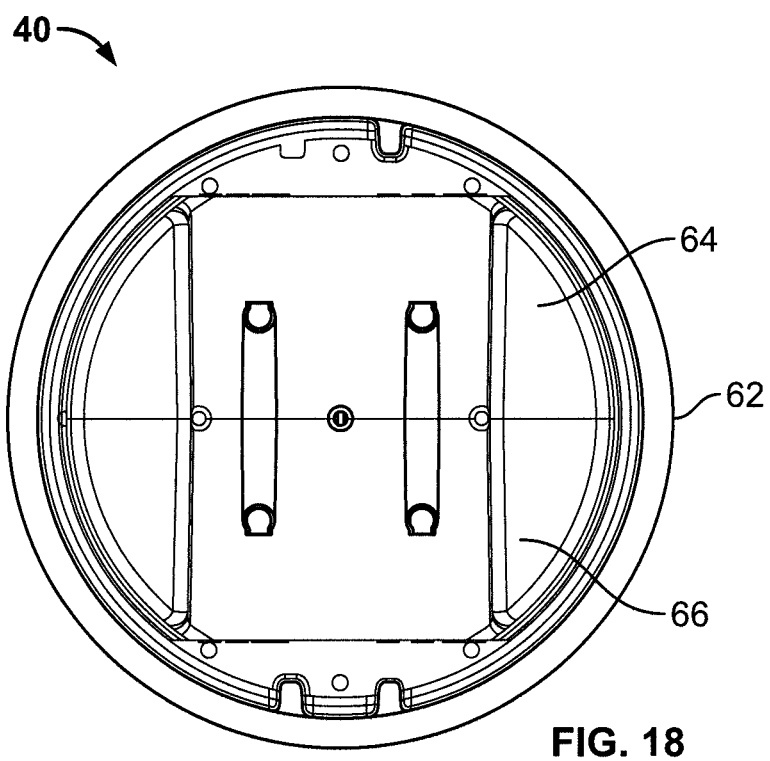
FIG. 18 is a bottom view of a chlorinator cartridge.
Figure 19:
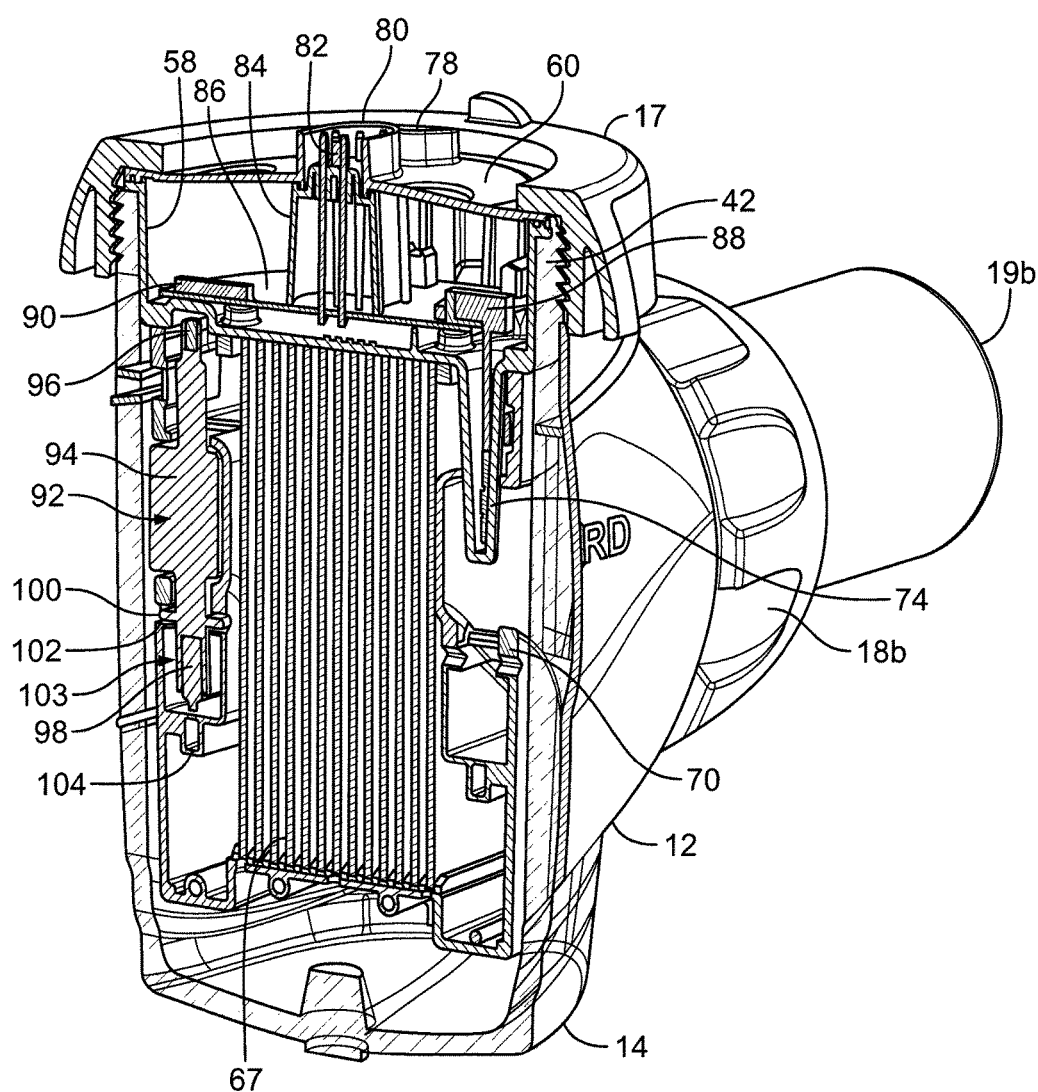
FIG. 19 is an isometric sectional view of a chlorinator housing a chlorinator cartridge.
Figure 20:
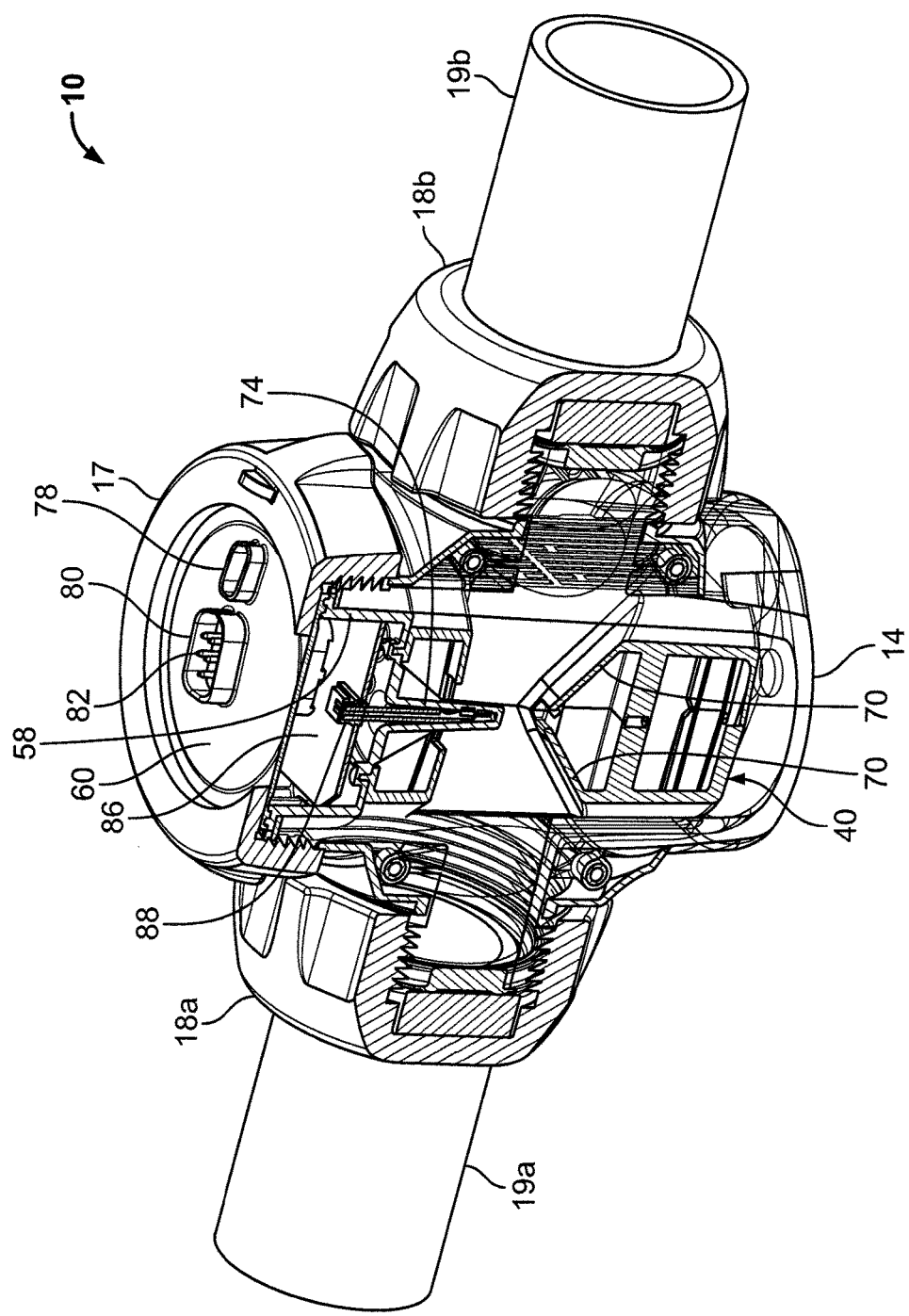
FIG. 20 is a partial sectional view of a chlorinator housing a chlorinator cartridge showing the details of a sensor.
Figure 21:
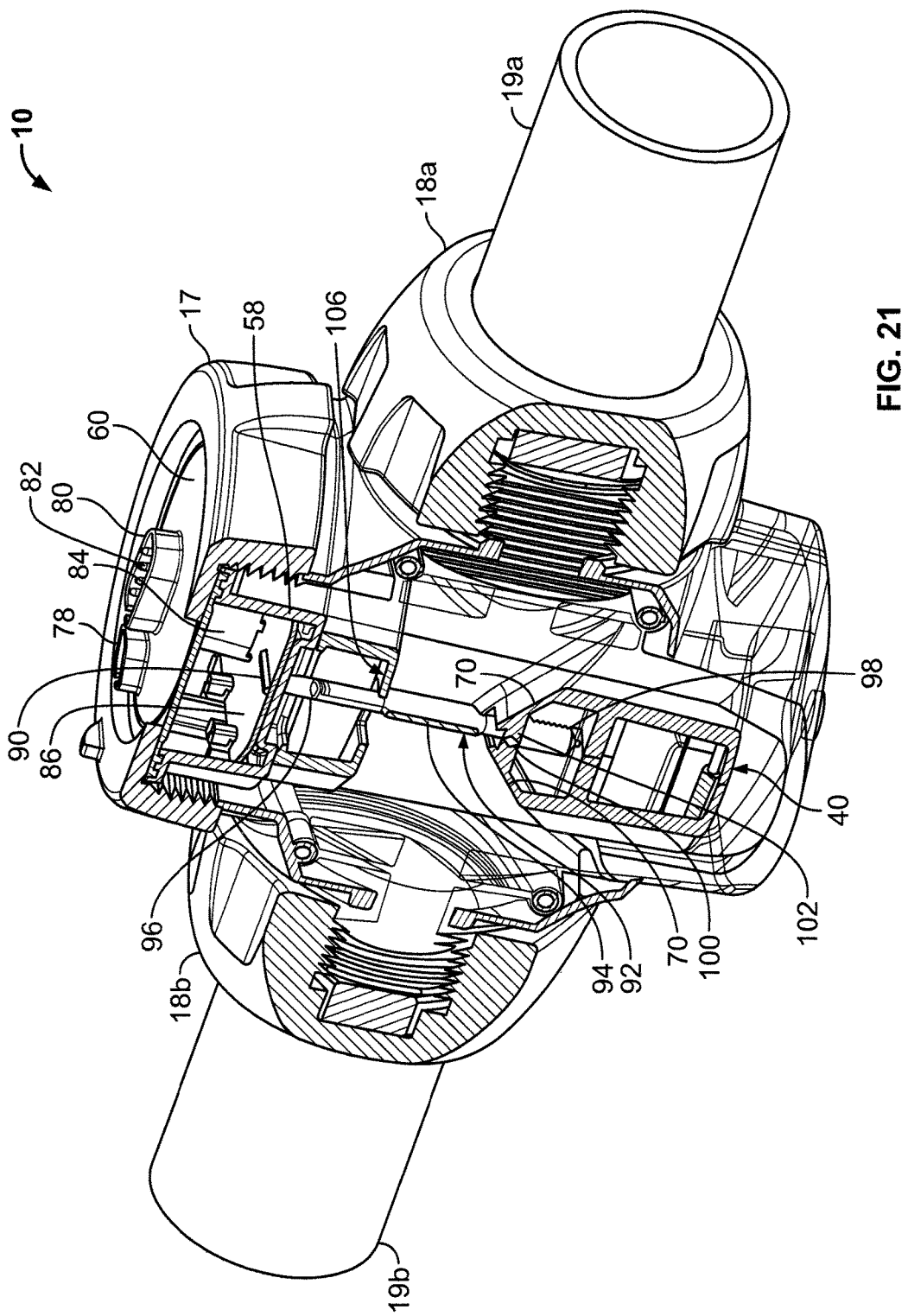
FIG. 21 is a partial sectional view of a chlorinator housing a chlorinator cartridge showing the details of a bi-directional flow switch.
Figure 22:
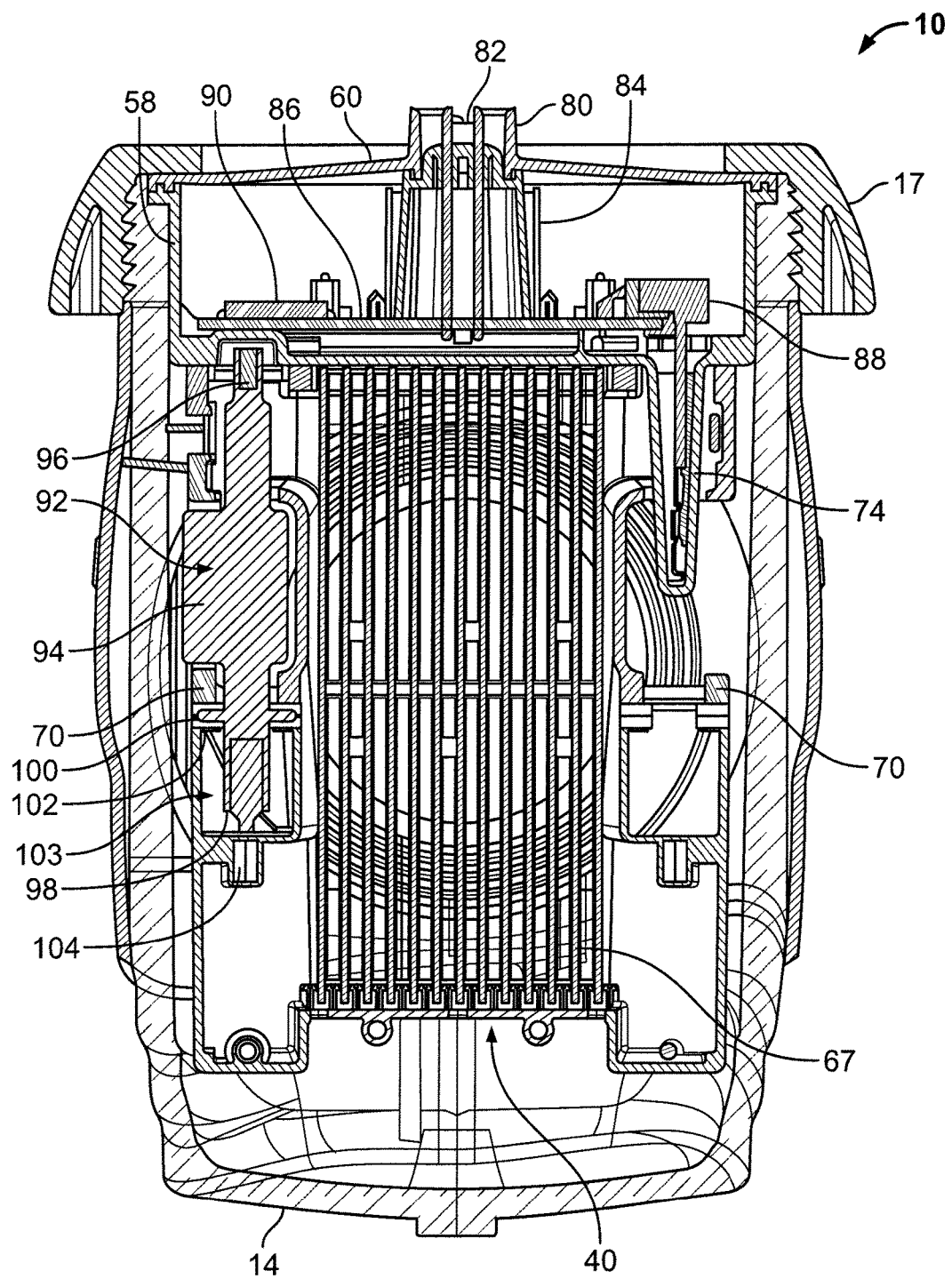
FIG. 22 is a sectional view of a chlorinator housing a chlorinator cartridge.

FIG. 12 is an exploded view of the chlorinator cartridge 40 of FIG. 11. The cartridge body 56 includes a first half 64 and a second half 66, which are interconnected by a snap-lock mechanism 68 and press fit pins, and houses a plurality of electrically-charged plates 67. The first and second cartridge halves 64, 66 define flow guides 70 that assist in straightening and guiding the flow of water passing across the chlorinator cartridge 40. The flow guides 70 are angled such that they function regardless of flow direction, i.e., the flow guides 70 will guide the flow when the cartridge 40 is positioned at either 0° or 180° with respect to the flow. The flow guides 70 also assist in guiding the flow to better contact the sensors 88 and a bi-directional paddle 92. Further, the flow guides 70 push adequate flow across the bi-directional paddle 92, discussed in greater detail below, during low speed filter pump operation. The flow guides 70 may include a plurality of ribs to promote laminar flow if needed. The first and second cartridge halves 64, 66 each include a plurality of ribs 72 that allow fluid to flow into the chlorinator cartridge 40 and across the plates 67.

The cartridge cap 58 defines a cavity 73 and includes a sensor housing 74, an annular flange 76, and annular wall 77. The sensor housing 74 extends from the bottom of the cartridge cap 58 and through the cartridge body 56 so that it is in a position to be in contact with fluid that is guided by the flow guides 70. The sensor housing 74 houses the various sensors 88 and/or associated probes that may be employed in the chlorinator cartridge 40, which will be discussed in greater detail below. The annular flange 76 extends radially from the cartridge cap 58, while the annular wall 77 extends upwardly therefrom. The annular flange 76 and the annular wall 77 provide a seat for the cartridge cap cover 60.

The cover 60 is seated within the annular wall 77, and on the annular flange 76, of the cartridge cap 58 and includes a locking key 78 and an electrical connector 80. The electrical connector 80 includes a plurality of connector pins 82 extending therethrough. The plurality of connector pins 82 are associated with a plug 84 that is connected to and in electrical communication with a printed circuit board (PCB) 86. The PCB 86 is generally housed in the cartridge cap 58, though in the exploded view of FIG. 12 it is shown in a different position to better illustrate its connection with the plurality of plates 67. The PCB 86 includes a microprocessor, non-volatile memory, at least one sensor 88 and a reed switch 90. While reference here is made to a reed switch, the reed switch 90 may alternatively be any suitable or equivalent sensor, and is not limited solely to a reed switch. The plurality of plates 67 include a plurality of tabs that extend through the cartridge cap 58 and are in electrical communication with the PCB 86, which they are powered by. The PCB 86 stores one or more parameters associated with the cartridge, such as minimum/maximum electrical parameters, cell coating and/or life expectancy of the cartridge, thermal operating parameters, salinity operating parameters, etc. Further, the PCB 86 also includes an identification system for the cartridge 40 so that the controller 20 can recognize and identify if the cartridge 40 is authentic. The PCB 86 can transmit this information to the controller 20 so that it can be used to configure operation of the chlorinator 10. Additionally, the microprocessor can process the information received by the sensors 88 and the reed switch 90, e.g., current water temperature, flow rate, pH levels, etc., and transfer this information to the controller 20, which information can be used in controlling the chlorinator. Information regarding the remaining cell life, e.g., the remaining plates 67, can be updated and stored in the non-volatile memory.

FIGS. 11-23 show the chlorinator cartridge 40 of the present invention in greater detail. As shown, the chlorinator cartridge includes a bi-directional paddle 92 which is in communication with the reed switch 90. The bi-directional paddle 92 includes a paddle 94, magnet 96, slug 98 and hinge 100. The hinge 100 engages a hinge saddle 102 formed in and by the first and second body halves 64, 66. The hinge 100 creates a point of rotation for the bi-directional paddle 92. The hinge saddle 102 may be diamond-shaped to provide clearance for any paddle hinge molding flash that may remain on the hinge 100 after manufacturing.

The bi-directional paddle 92 functions such that the reed switch 90 detects the presence of the magnet 96 when the bi-directional paddle 92 is upright, thereby indicating that there is no flow. Because the reed switch 90 is connected to the PCB 86, this signal is recognized by the system and transmitted to the controller 20. Similarly, when flow through the cartridge 40 emits force on the paddle 94 causing the bi-directional paddle 92 to rotate about the hinge 100, the reed switch 90 does not detect the presence of the magnet 96 and the system determines that there is flow present in the system. The body 56 includes a bi-directional space 106 that provides an opening on both sides of the bi-directional paddle 92 when it is in an upright position (i.e., no-flow position). The space 106 allows the bi-directional paddle 92 to rotate both clockwise and counter-clockwise about the hinge 100. Bi-directional rotation allows flow to be detected in both directions. Therefore, the cartridge 40 can be installed in the chlorinator body 14 at either 0° or 180° with respect to the water flow.

Located at a bottom portion of the bi-directional paddle 92 is the slug 98, which extends into a chamber 103 of the cartridge body 56 located below the flow guides 70. The slug 98 is preferably made of a ferromagnetic material. The slug 98 functions as a counter-weight and as a centering mechanism due to its attraction to a centering magnet 104 disposed directly below the chamber 103. When there is no flow through the cartridge 40, the slug 98 will be attracted to the centering magnet 104 keeping the bi-directional paddle 92 centered so that the reed switch 90 detects the flow magnet 96. However, the centering magnet 104 is weak enough where a flow through the cartridge 40 will break the magnetic attraction between the slug 98 and the centering magnet 104, allowing the reed switch 90 to detect the flow through the cartridge 40. It is advantageous for each component of the bi-directional paddle 92 to be constructed of a non-corrosive material so such components are not affected by the fluid flowing across them.

In another embodiment, the reed switch 90 is a hall effect sensor. In this embodiment, the bi-directional paddle 92 would be identical to the embodiment utilizing a reed switch. Specifically, the end of the paddle 94 would include a flow magnet 96 that the hall effect sensor would sense. Alternatively, a single hot-wire anemometer may be utilized in place of the reed switch 90. In this contemplated embodiment, fluid flowing past the anemometer would have a cooling effect thereon, from which a flow speed could be calculated. From this, the system would determine if there is a flow through the cartridge 40. Other flow sensing devices that are known in the art are contemplated, and may be utilized as the reed switch 90.

Connected to the PCB 86 is at least one sensor 88, but in some instances may be a plurality of sensors 88. The sensors 88 are connected to the PCB 86 and extend into the sensor housing 74. The sensor 88 may be a temperature sensor, pH sensor, ORP sensor, etc.

In this system, the flow sensing device 90, the bi-directional paddle 92 and the sensors 88 are built into the replaceable chlorinator cartridge 40. As such, when a user replaces the cartridge 40, the reed switch 90, the bi-directional paddle 92 and the sensors 88 are also replaced.

Figure 23:
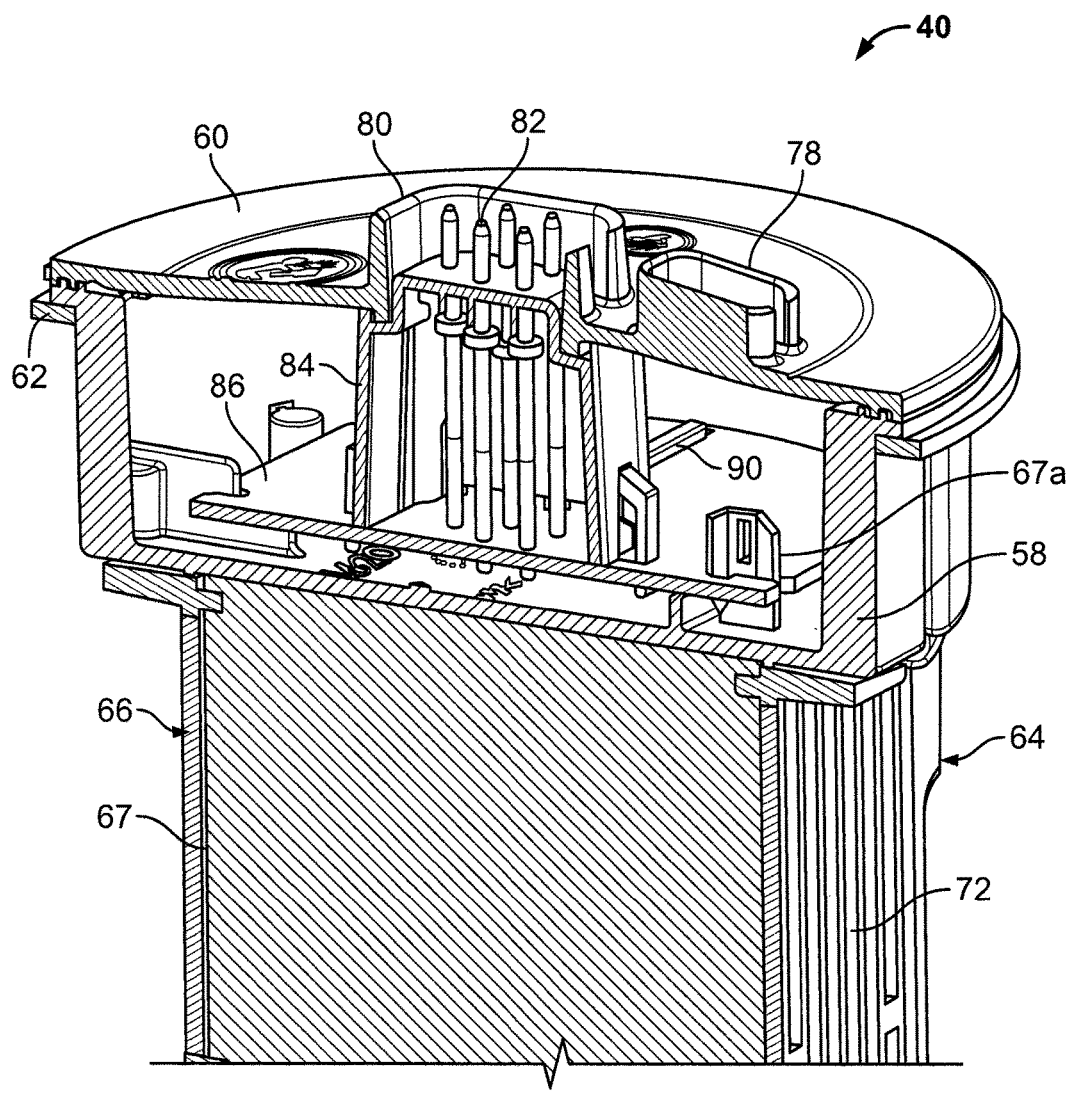
FIG. 23 is a partial sectional view of a chlorinator cartridge showing the details of a plug.
Figure 24:
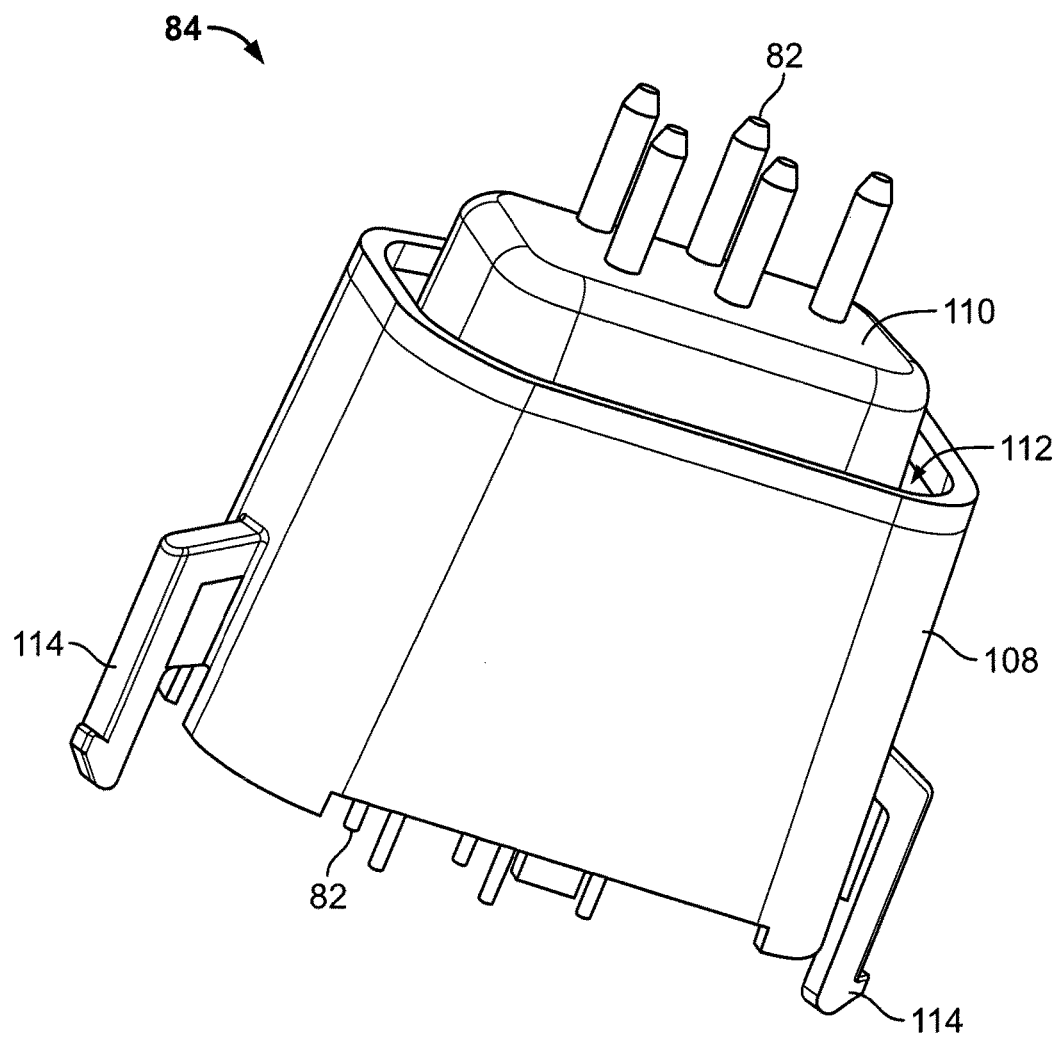
FIG. 24 is a perspective view of a plug of a chlorinator cartridge.

As mentioned previously, the chlorinator cartridge 40 includes a plug 84 that connects directly to the PCB 86. FIG. 23 is a sectional view of the interconnection between the plug 84 and the PCB 86, and the positioning of the plug 84 in the chlorinator cartridge 40. Further, FIG. 24 is a perspective view of the plug 84 showing it in greater detail. The plug 84 includes a body 108, a boss 110 extending from the body 108, a sealing trough 112 formed between the body 108 and the boss 110. The plug 84 includes a plurality of pins 82 extending through the entirety thereof so that the pins 82 engage the PCB 86 and extend into the connector 80. The plug 84 includes a plurality of locking arms 114 extending from the body 108. The locking arms 114 engage the PCB 86 to secure the plug 84 thereto. Once secured to the PCB 86, the plug 84 may be wave-soldered to provided better electrical connection and mechanical strength to the plug 84. The pins 82 provide an external connection to the PCB 86. When the cartridge cap cover 60 is placed on top of and in engagement with the cartridge cap 58, a protrusion on the underside of the cartridge cap cover 60 engages the trough 112 of the plug 84. An adhesive may be placed within the trough 112 so that the plug 84 and the cartridge cap cover 60 are sealed together in a water-tight relationship. As such, water can not enter the cap cover 58 and contact the PCB 86. Optionally, the connector 80 and the locking key 78 of the cap cover 60 may include a slot for water drainage.

The plug 84 also functions as a unique connection system that restricts unapproved cartridges from being used in the system. The pins 82 are arranged in a unique and irregular pentagonal pattern, but still provide directional orientation. The plug 84 may be constructed by injection molding, or other suitable process.

Figure 25:
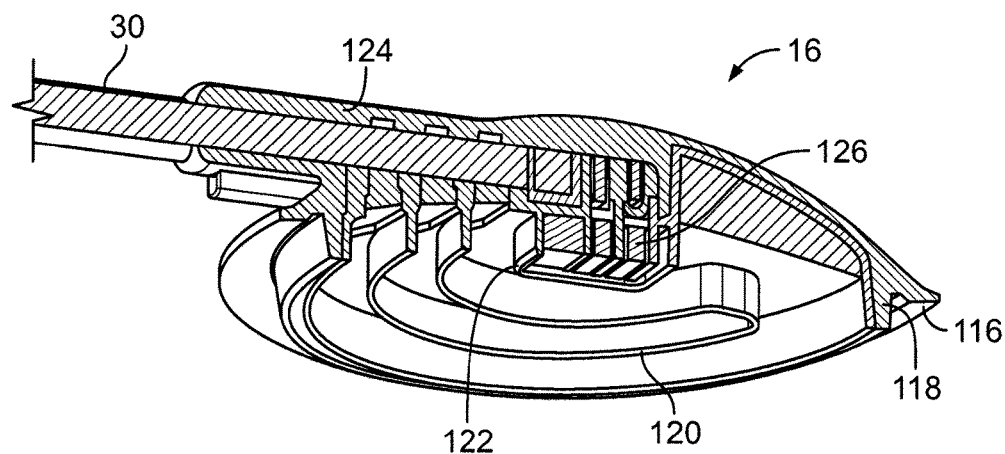
FIG. 25 is a partial perspective view of a chlorinator cartridge lid.

The plug 84, specifically the pins 82, connects with a cartridge lid 16. FIG. 25 is a partial perspective view of the cartridge lid 16. The cartridge lid 16 includes a locking protrusion 120 and a connector terminal 122, both disposed on the underside of the cartridge lid 16. The cartridge lid 16 also includes a cable port 124 that protrudes from the top of the cartridge lid 16. The connector terminal 122 includes a plurality of terminal ports 126 that engage the plurality of pins 82 of the plug 84. The terminal ports 126 are arranged in a unique and irregular pentagonal pattern identical to that of the plurality of pins 82 so that they can interface with each other. The cable port 124 provides an entrance for the cable 30 so it is in electrical communication with the plug 84, and creates a water-tight seal with the cable 30. The cartridge lid 16 is configured to be positioned adjacent the cover 60 so that the locking key 78 engages the locking protrusion 120, restricting rotational movement, and the pins 82 engage the terminal ports 126. When the cartridge lid 16 is connected with the cover 60, i.e., when the pins 82 are engaged with the terminal ports 126, the cable 30 is in electrical communication with the electrical components of the chlorinator cartridge 40. This connection provides both signal and high-current power between the cell cartridge 40 and the controller 20.

When the chlorinator cartridge 40 is inserted into the chlorinator 10, and housed in the cartridge housing area 54, the o-ring 62 engages a front annular face of the cartridge port 42 such that the o-ring 62 is compressed between the cartridge port 42 and a lip of the cartridge cap 58. The screw cap 17 further compresses the o-ring as it is tightened to the cartridge port 42, securing the cartridge 40 within the chlorinator 10. The o-ring 62 may alternatively be a flat gasket or other sealing agent, or replaced by any other known sealing methodology.

Figure 26:
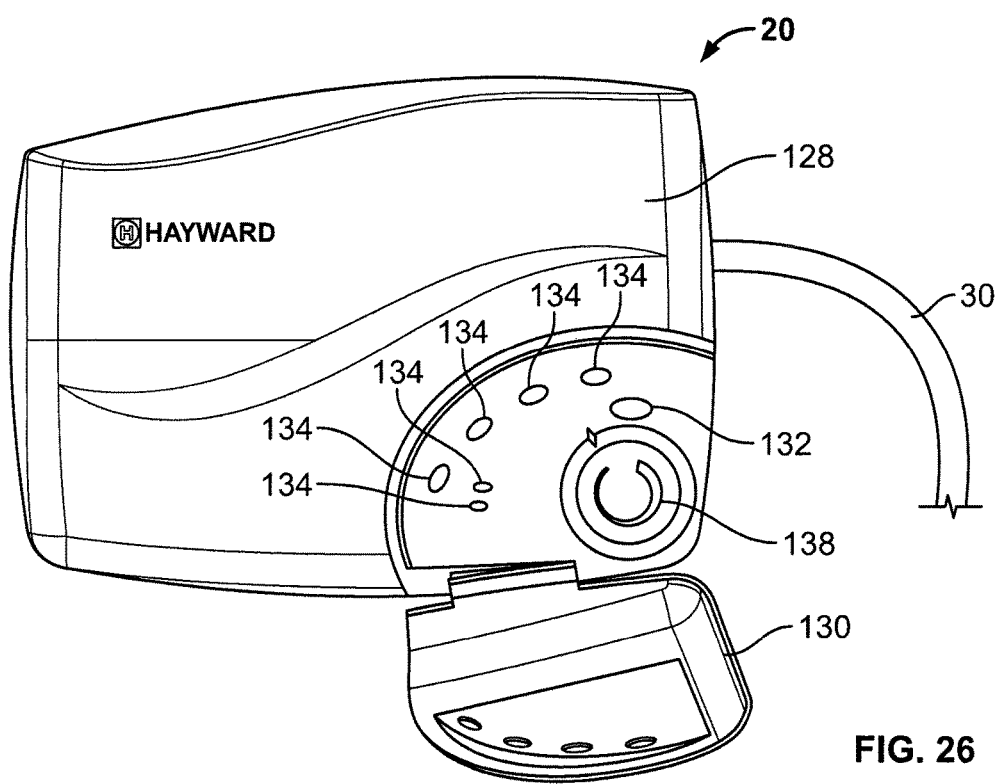
FIG. 26 is a front view of a chlorinator controller.

FIG. 26 is a front view of the controller 20 of the present invention. The cable 30 is connected to the cartridge lid 16 and runs from the controller 20 to the connector lid 16, placing the two in electrical communication. The controller 20 may include a housing 128, controller cover 130, a "super-chlorinate" button 132, a plurality of status lights 134, and a control knob 138. The controller 20 functions to adjust the operating parameters of the chlorinator cartridge 40 and may receive data from the chlorinator cartridge 40 regarding operational information and parameters. This information may be utilized by the controller 20 to activate any one of the plurality of status lights 134 to inform a user of various operating conditions. The plurality of status lights 134 may alternatively be a single or a plurality of LCD screens or other display technology that is known. These conditions may, for example, be any one of a standby mode, need for increase or decrease in chlorinator output, need for chlorinator replacement, error condition, or any other condition that may be feasible. The control knob 138 may be rotated by a user to adjust the daily chlorine output to a desired level. Further, the control cover 130 may be hingedly attached to the controller housing 128 such that it can be closed or opened. When in a closed position, the control cover 130 covers the control knob 138, but may include a plurality of holes that align with the plurality of status lights 134. This allows a user to view the status of the system without having to open the control cover 130. When a user desires to adjust the chlorine output, he or she may simply flip the control cover 130 down and rotate the control knob 138. The controller 20 may be mountable so that it can be mounted on a wall or a post, depending on user preference.

Although the foregoing disclosure was discussed in connection with pools and spas, it is to be understood that the systems and methods disclosed herein could be utilized in connection with any body of water where sanitization is necessary, e.g., fountains, ponds, water features, etc.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

What is claimed is:
1. A replaceable cartridge for a chlorinator, comprising:
   a cartridge body removable from the chlorinator, the cartridge body having a plurality of electrically-charged plates; and
   a printed circuit board positioned in said cartridge body and in electrical communication with said electrically-charged plates, said printed circuit board including a memory for storing information relating to operation of the replaceable cartridge;

wherein said cartridge body houses said memory, said printed circuit board, and said electrically-charged plates;

wherein said cartridge body, said memory, said printed circuit board and said electrically-charged plates form a single unit removable from the chlorinator; and wherein said electrically-charged plates and said cartridge body of said single unit are positioned along a first axis defining a fluid flow path such that fluid enters, exits and flows through said electrically-charged plates and said cartridge body of said single unit along the first axis, the first axis being transverse to a second axis along which the single unit is removable from the chlorinator.

2. The replaceable cartridge of claim 1, wherein said printed circuit board includes a microprocessor in electrical communication with said memory.

3. The replaceable cartridge of claim 2, further comprising a cartridge cap connected to said cartridge body, said cartridge cap including said printed circuit board.

4. The replaceable cartridge of claim 3, further comprising a cartridge cover connected to said cartridge cap, said cartridge cover including a locking key and an electrical connector in communication with said printed circuit board.

5. The replaceable cartridge of claim 4, further comprising at least one sensor connected to said printed circuit board, said at least one sensor sensing a parameter relating to the operation of the replaceable cartridge.

6. The replaceable cartridge of claim 5, further comprising a bi-directional paddle and a reed switch in electrical communication with said printed circuit board, said bi-directional paddle in communication with said reed switch to detect fluid flow through the replaceable cartridge.

7. The replaceable cartridge of claim 6, further comprising a ferromagnetic slug and a centering magnet having magnetic attraction to said slug, such that in the absence of fluid flow through the replaceable cartridge, said slug is attracted to said centering magnet.

8. The replaceable cartridge of claim 7, wherein when fluid flows through the replaceable cartridge, the magnetic attraction between said slug and said centering magnet is broken.

9. The replaceable cartridge of claim 8, wherein said reed switch is a hall effect sensor.

10. The replaceable cartridge of claim 8, wherein the cartridge cap includes a plug in communication with said cartridge cover and said printed circuit board.

11. A replaceable cartridge for a chlorinator, comprising:
a replaceable chlorinator cartridge removably positionable within a chlorinator body;
said replaceable chlorinator cartridge including a cartridge body, a cartridge cap, a plurality of electrolytic plates and at least one circuit element in electrical communication with said plurality of electrolytic plates;
said replaceable chlorinator cartridge housing said plurality of electrolytic plates and said at least one circuit element;
said cartridge cap housing said at least one circuit element and said cartridge body housing said plurality of electrolytic plates;
said replaceable chlorinator cartridge, said plurality of electrolytic plates and said at least one circuit element forming a single unit removable from said chlorinator body; and
said plurality of electrolytic plates and said replaceable chlorinator cartridge of said single unit are positioned along a first axis defining a fluid flow path such that fluid enters, exits, and flows through said plurality of electrolytic plates and said replaceable chlorinator cartridge of said single unit along the first axis, the first axis being transverse to a second axis along which the single unit is removable from the chlorinator body.

12. The replaceable cartridge of claim 11, further comprising a printed circuit board and a microprocessor in electrical communication with a memory.

13. The replaceable cartridge of claim 12, further comprising a cartridge cover connected to said cartridge cap, said cartridge cover including a locking key and an electrical connector in communication with said printed circuit board.

14. The replaceable cartridge of claim 13, further comprising at least one sensor connected to said printed circuit board, said at least one sensor sensing a parameter relating to the operation of the replaceable cartridge.

15. The replaceable cartridge of claim 14, further comprising a bi-directional paddle and a reed switch in electrical communication with said printed circuit board, said bi-directional paddle in communication with said reed switch to detect fluid flow through the replaceable cartridge.

16. The replaceable cartridge of claim 15, further comprising a ferromagnetic slug and a centering magnet having magnetic attraction to said slug, such that in the absence of fluid flow through the replaceable cartridge, said slug is attracted to said centering magnet.

17. The replaceable cartridge of claim 16, wherein when fluid flows through the replaceable cartridge, the magnetic attraction between said slug and said centering magnet is broken.

18. The replaceable cartridge of claim 17, wherein said reed switch is a hall effect sensor.

19. The replaceable cartridge of claim 18, wherein the cartridge cap includes a plug in communication with said cartridge cover and said printed circuit board.

* * * * *